US011469894B2

(12) United States Patent
Momchilov et al.

(10) Patent No.: US 11,469,894 B2
(45) Date of Patent: Oct. 11, 2022

(54) COMPUTING SYSTEM AND METHODS PROVIDING SESSION ACCESS BASED UPON AUTHENTICATION TOKEN WITH DIFFERENT AUTHENTICATION CREDENTIALS

(71) Applicant: CITRIX SYSTEMS, INC., Fort Lauderdale, FL (US)

(72) Inventors: Georgy Momchilov, Parkland, FL (US); Hubert Divoux, Parkland, FL (US); Roberto Valdes, Weston, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 69 days.

(21) Appl. No.: 16/739,342

(22) Filed: Jan. 10, 2020

(65) Prior Publication Data
US 2020/0374121 A1   Nov. 26, 2020

Related U.S. Application Data

(60) Provisional application No. 62/850,156, filed on May 20, 2019.

(51) Int. Cl.
*H04L 9/32* (2006.01)
*G06F 9/451* (2018.01)
*H04L 9/08* (2006.01)

(52) U.S. Cl.
CPC ............ *H04L 9/3213* (2013.01); *G06F 9/452* (2018.02); *H04L 9/0825* (2013.01); *H04L 9/0866* (2013.01)

(58) Field of Classification Search
CPC ... H04L 9/3213; H04L 9/0825; H04L 9/0866; H04L 29/06; H04L 9/08; H04L 9/32; G06F 9/452; G06F 21/31; G06F 9/451
See application file for complete search history.

(56) References Cited

U.S. PATENT DOCUMENTS

| | | | |
|---|---|---|---|
| 8,990,898 B2 | 3/2015 | Bell | |
| 9,313,203 B2* | 4/2016 | Adler | H04L 63/101 |
| 9,972,005 B2* | 5/2018 | Wong | G06Q 20/327 |
| 10,122,709 B2 | 11/2018 | Momchilov et al. | |
| 10,404,678 B2* | 9/2019 | Grajek | H04L 63/0815 |
| 10,715,327 B1* | 7/2020 | Ramanujan | H04L 9/3234 |
| 2007/0143832 A1* | 6/2007 | Perrella | H04L 9/3263 726/5 |
| 2009/0037729 A1* | 2/2009 | Smith | H04L 9/3263 713/158 |
| 2009/0132813 A1* | 5/2009 | Schibuk | G06Q 20/40 726/9 |

(Continued)

FOREIGN PATENT DOCUMENTS

| | | |
|---|---|---|
| WO | WO2006121854 | 11/2006 |
| WO | WO2018234886 | 12/2018 |

*Primary Examiner* — Techane Gergiso
(74) *Attorney, Agent, or Firm* — Allen, Dyer, Doppelt + Gilchrist, PA

(57) ABSTRACT

A computing device may include a memory and a processor configured to cooperate with the memory to store an authentication token having first and second authentication credentials associated therewith. The first and second authentication credentials may be different from one another. The processor may further cooperate with a server to access a session based upon the authentication token.

15 Claims, 22 Drawing Sheets

(56) References Cited

U.S. PATENT DOCUMENTS

| | | | |
|---|---|---|---|
| 2011/0258452 A1* | 10/2011 | Coulier | H04L 9/3271 |
| | | | 713/171 |
| 2011/0265159 A1* | 10/2011 | Ronda | H04L 9/3234 |
| | | | 726/6 |
| 2012/0204245 A1* | 8/2012 | Ting | H04L 9/3228 |
| | | | 726/6 |
| 2012/0233705 A1* | 9/2012 | Boysen | G06F 21/77 |
| | | | 726/29 |
| 2014/0189808 A1* | 7/2014 | Mahaffey | H04L 63/0853 |
| | | | 726/4 |
| 2014/0189841 A1* | 7/2014 | Metke | G06F 21/40 |
| | | | 726/9 |
| 2014/0304514 A1* | 10/2014 | Greene | G06F 21/6227 |
| | | | 713/173 |
| 2015/0180868 A1* | 6/2015 | Sng | G06F 12/121 |
| | | | 726/9 |
| 2015/0319174 A1 | 11/2015 | Hayton et al. | |
| 2015/0341340 A1* | 11/2015 | Lu | H04L 9/3234 |
| | | | 726/6 |
| 2015/0381621 A1 | 12/2015 | Innes et al. | |
| 2016/0065568 A1* | 3/2016 | Dave | G06F 21/32 |
| | | | 726/4 |
| 2016/0094543 A1 | 3/2016 | Innes et al. | |
| 2016/0191494 A1* | 6/2016 | Claes | H04L 63/0853 |
| | | | 713/159 |
| 2017/0126661 A1* | 5/2017 | Brannon | H04L 63/0823 |
| 2017/0288937 A1* | 10/2017 | Zhang | H04L 9/3213 |
| 2018/0007059 A1 | 1/2018 | Innes et al. | |
| 2018/0137512 A1* | 5/2018 | Georgiadis | H04L 63/08 |
| 2018/0165781 A1* | 6/2018 | Rodriguez | G06Q 40/00 |
| 2018/0183793 A1* | 6/2018 | Mandadi | H04L 63/0807 |
| 2018/0183802 A1* | 6/2018 | Choyi | H04L 63/101 |
| 2018/0295120 A1* | 10/2018 | Dawson | H04L 63/0861 |
| 2019/0018697 A1* | 1/2019 | Larsson | G06F 21/31 |
| 2019/0058700 A1* | 2/2019 | Kurian | H04L 63/0823 |
| 2019/0245848 A1 | 8/2019 | Divoux et al. | |
| 2019/0278616 A1 | 9/2019 | Momchilov et al. | |
| 2019/0372977 A1* | 12/2019 | Ben-David | H04L 12/2818 |
| 2020/0067904 A1* | 2/2020 | Hugot | H04L 63/0807 |

* cited by examiner

COMPUTING SYSTEM AND METHODS PROVIDING SESSION ACCESS BASED UPON AUTHENTICATION TOKEN WITH DIFFERENT AUTHENTICATION CREDENTIALS

BACKGROUND

Many organizations are now using application and desktop virtualization to provide a more flexible option to address the varying needs of their users. In desktop virtualization, a user's applications may be separated from the user's physical desktop computer. Using client-server technology, a "virtualized desktop" may be stored in and administered by a remote server, rather than in the local storage of the client device.

There are several different types of desktop virtualization systems. As an example, Virtual Desktop Infrastructure (VDI) refers to the process of running a user desktop and/or application inside a virtual machine that resides on a server. Virtualization systems may also be implemented in a cloud computing environment in which a pool of desktop virtualization servers, storage disks, networking hardware, and other physical resources may be used to provision virtual desktops, and provide access to shared applications. Client devices may also remotely access Web and Software as a Service (SaaS) applications, either directly or through a virtualization system, for example.

SUMMARY

A computing device may include a memory and a processor configured to cooperate with the memory to store an authentication token having first and second authentication credentials associated therewith. The first and second authentication credentials may be different from one another. The processor may further cooperate with a server to access a session based upon the authentication token.

In an example configuration, one of the first and second authentication credentials may comprise a user credential. By way of example, the user credential may be stored in the memory at the client device. In accordance with another example, the user credential may be stored in a virtual smart card with an authentication service.

In another example embodiment, one of the first and second authentication credentials may comprise a public key associated with the client device. By way of example, the public encryption key may be signed by a Root of Trust (RoT). In another example configuration, one of the first and second authentication credentials may comprise a ticket or token pointing to an encrypted user credential stored in cloud storage.

The processor may cooperate with the server to access the session further based upon a connection lease assigned to the computing device, for example. Furthermore, in some example implementations the first and second authentication credentials may be stored in different locations. By way of example, the authentication token may comprise a polymorphic authentication token. Moreover, the session may comprise at least one of a Web application session, Software as a Service (SaaS) application session, virtual application session, and a virtual desktop session, for example.

A related method may include storing an authentication token for a client device having first and second authentication credentials associated therewith, with the first and second authentication credentials being different from one another. The method may further include, at the client device, cooperating with a server to access a session based upon the authentication token.

DETAILED DESCRIPTION

Connection leases (CLs) provide an approach for offline authorized access by client or endpoint devices to resource locations in terms of network connectivity and initial session establishment. However, even with CLs there may still be a need for user authentication into a remote session. For example, a virtual delivery agent may require user credentials to log a user into a virtual session. More particularly, explicit credentials such as user name and password may need to be provided to a Credential Provider or Credential Provider Filter at the virtual delivery appliance, which then provides the credentials to the Windows Logon subsystem to log the user into a new Windows session or attach to an existing session. Likewise, a gateway appliance may similarly require user authentication.

Without user authentication single-sign-on (SSOn), users may be required to enter their credentials every time they connect via a CL, which will detract from the User Experience (UX) of connection leasing. Existing systems for SSOn may rely on storing user credentials on the endpoint device, which makes them vulnerable to theft and replay attacks, e.g., by other users and/or from other devices. Other approaches may rely on storing credentials in the Cloud and making them retrievable or reusable via a Cloud interface, such as Citrix Workspace, for example. However, storing user credentials in the Cloud in a readily decryptable form may have security as well as privacy concerns. Therefore, some approaches may require that Cloud-stored credentials are short-lived, e.g., a few minutes or a few hours. However, this does not align well with the usage of CLs, which are long-lived, e.g., providing resource access for two weeks or more without re-authentication.

Furthermore, Cloud-stored credentials may not always be directly useable. This might occur when the cloud service is down or otherwise unreachable from the endpoint device, for example.

Additional use cases include SSOn for purposes of published resource enumeration, endpoint device key bootstrapping, requesting CLs to be generated and synchronizing (downloading) CLs to the endpoint respectively, etc., for example. Some of these use cases may not necessarily require explicit user credentials, but may still require the use of long-lived authentication. The approach described herein advantageously helps address the above-noted technical challenges with user authentication, including within a CL architecture, while also allowing for relatively long-lived authentication for CL and other authentication operations through the use of authentication tokens that are based upon multiple different authentication credentials.

Figure 1:
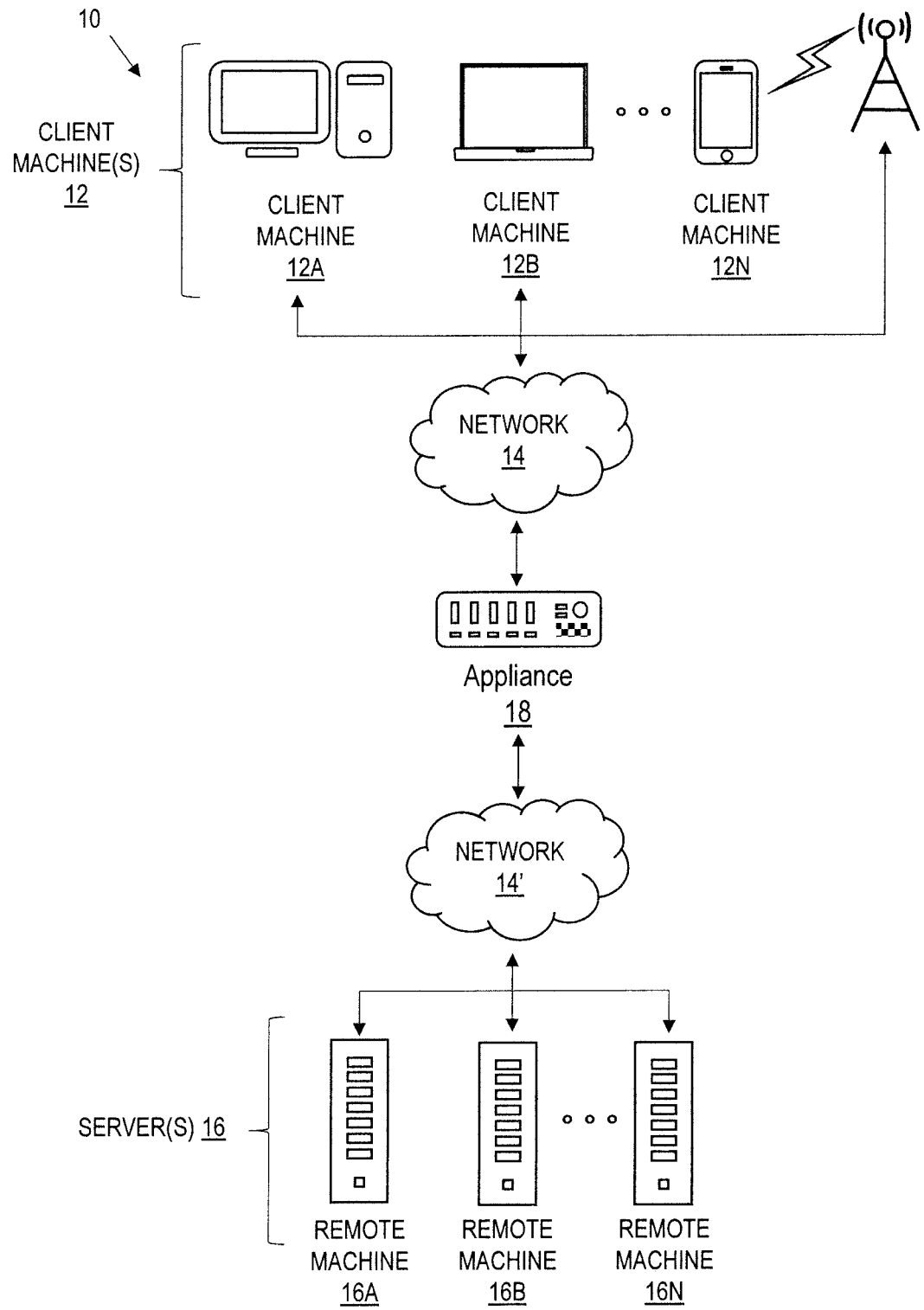
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 108 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
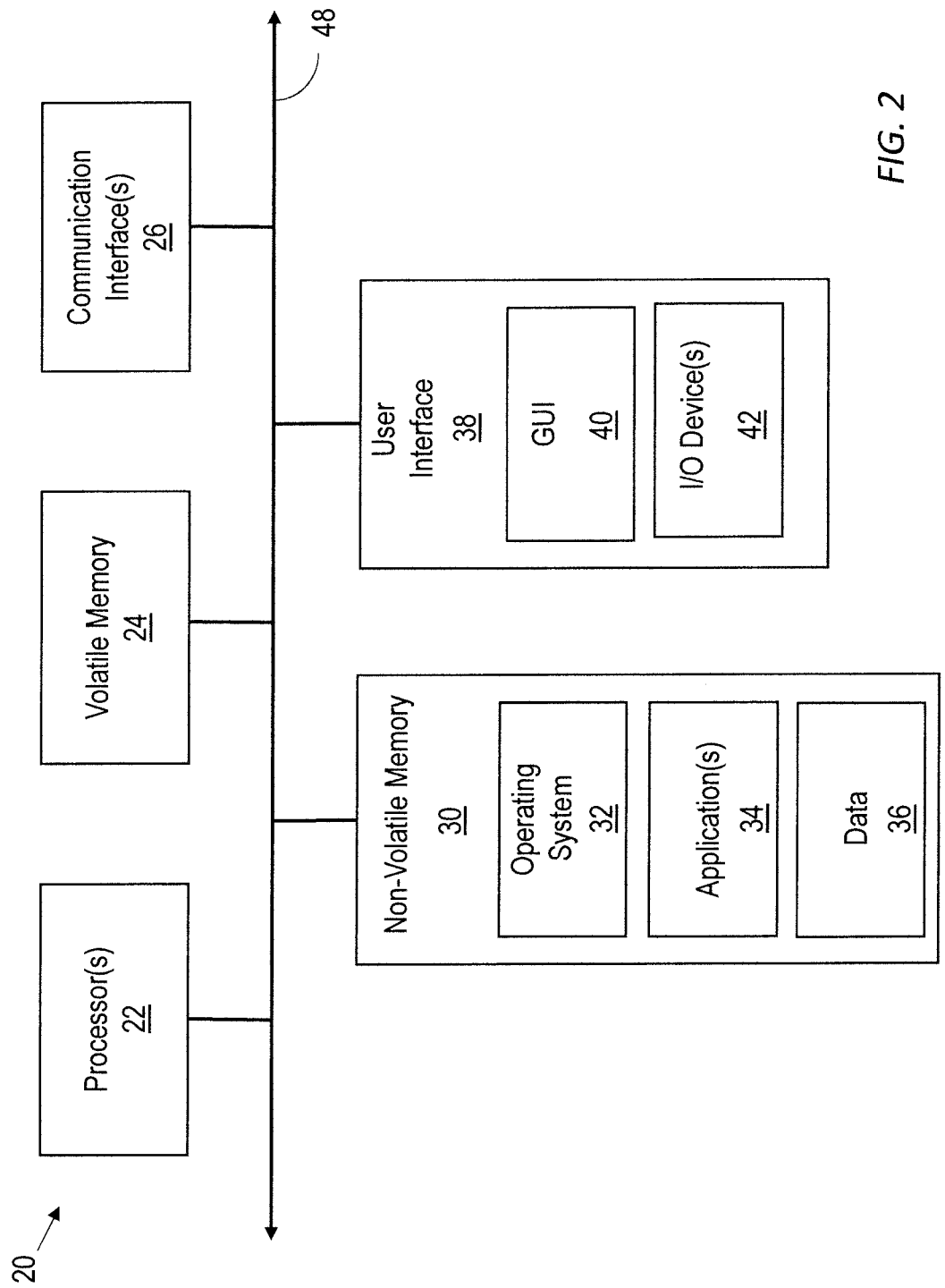
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Fla. ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
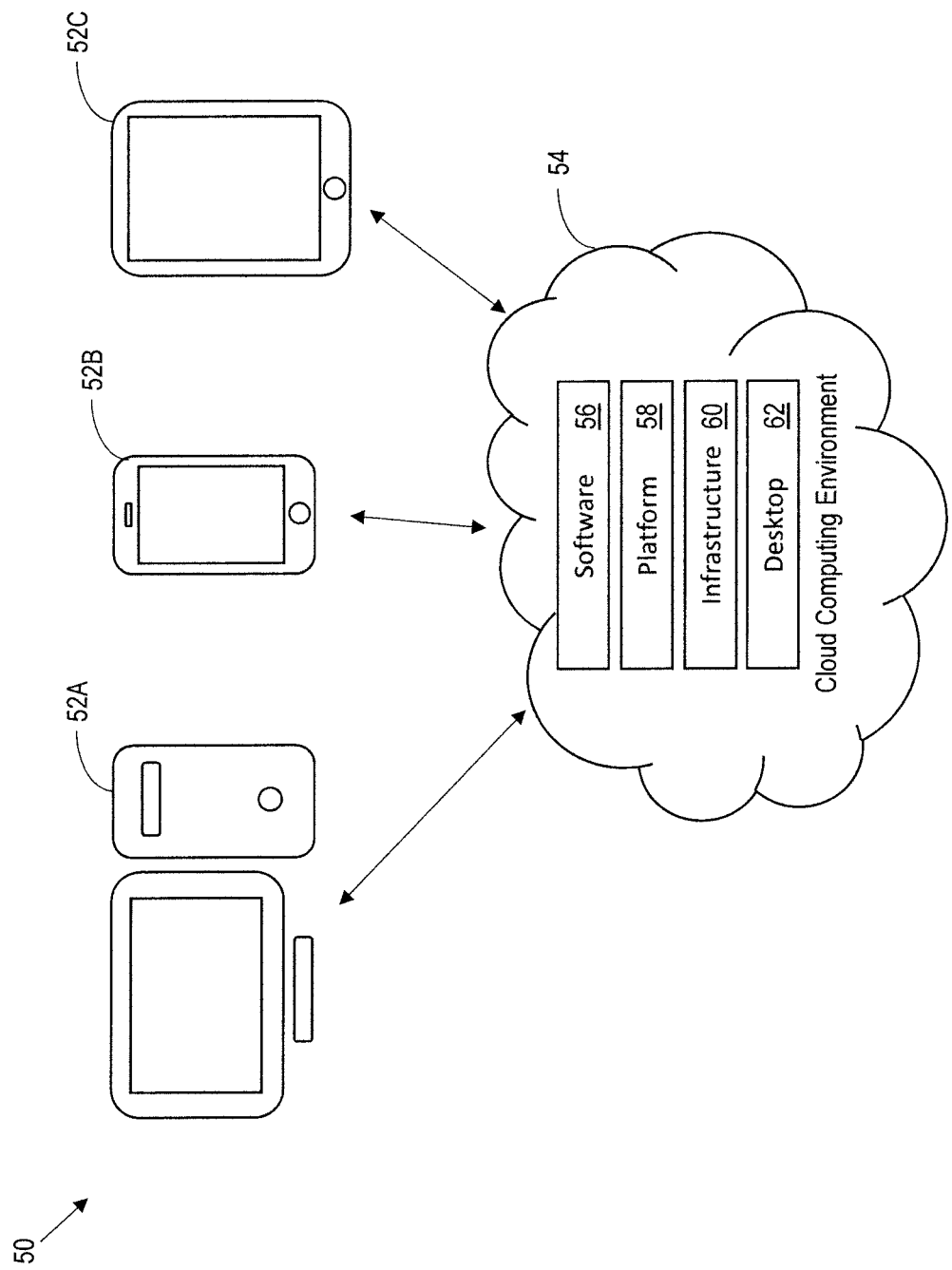
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOGGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
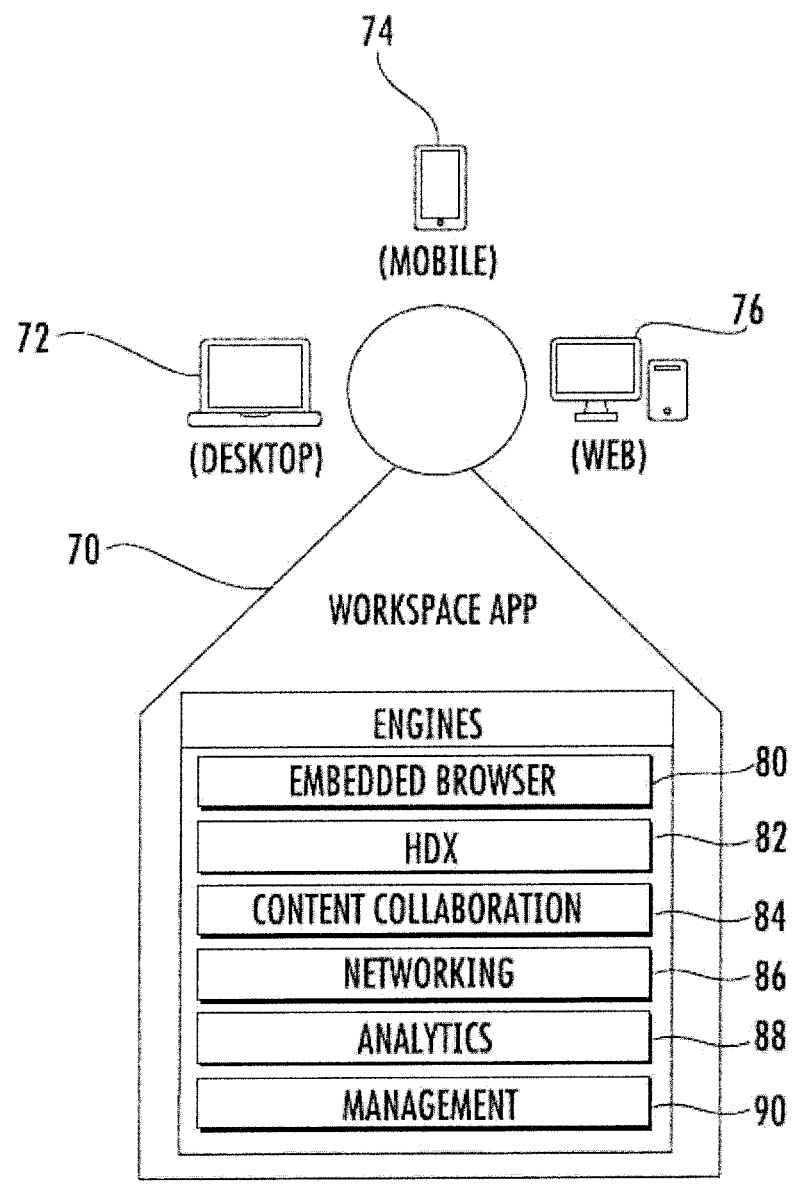
FIG. 4 is a schematic block diagram of desktop, mobile and web-based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
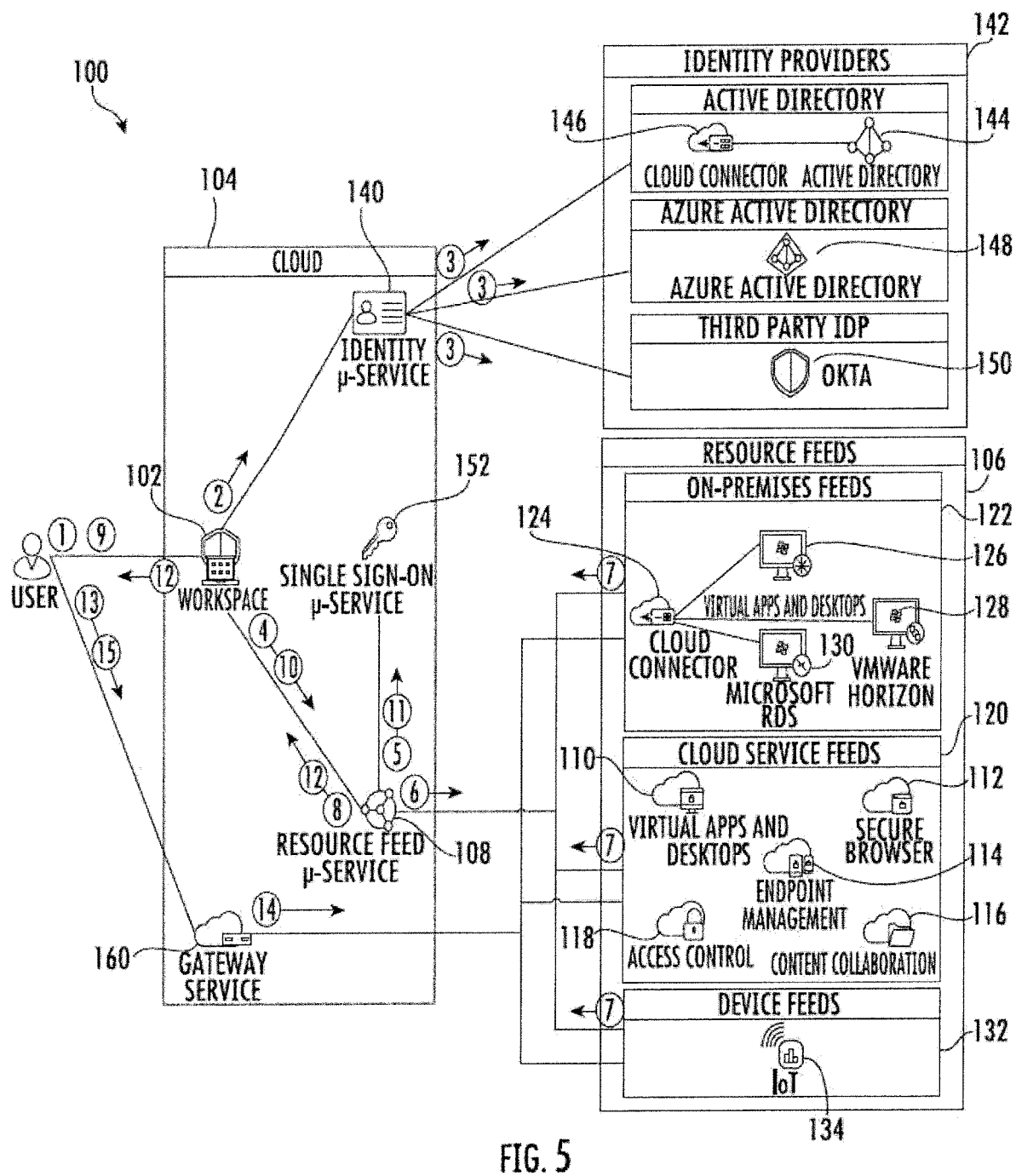
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Cloud 104. The workspace experience service 102 then pulls in all the different resource feeds 16 via a resource feed micro-service 108. That is, all the different resources from other services running in the Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Cloud 104, and presenting their identity (event 1). The identity includes a user name and password, for example.

The workspace experience service 102 forwards the user's identity to an identity micro-service 140 within the Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
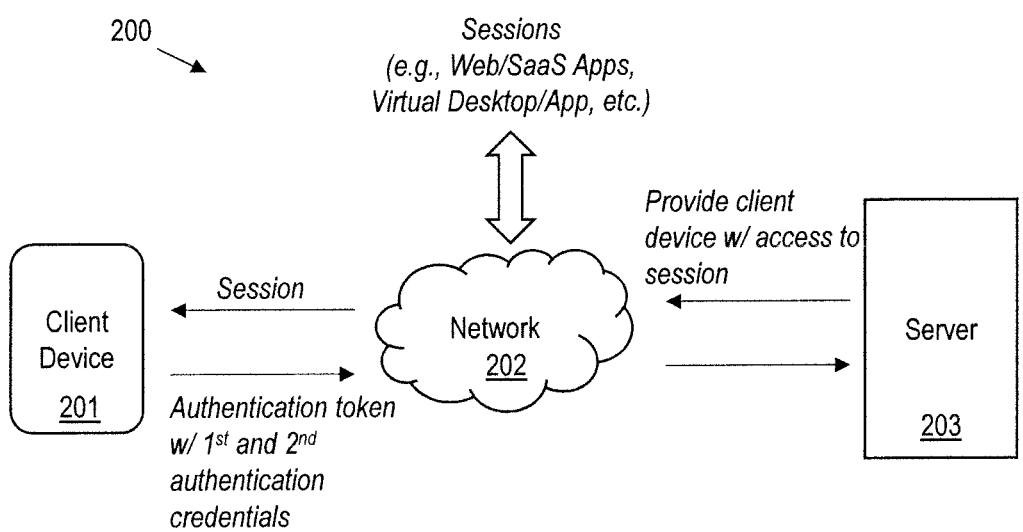
FIG. 6 is a schematic block diagram of a computing system providing client device session access based upon an authentication token having different authentication credentials associated therewith in accordance with an example embodiment.

Referring now to FIG. 6, a computing system 200 illustratively includes a client device 201, such as those discussed above (e.g., client machines 12 and clients 52), which is configured to access a session via a network 202 (e.g., the internet) based upon an authentication token having first and second authentication credentials associated therewith. More particularly, the first and second authentication credentials are different from one another, such as user and device credentials, for example, as will be discussed further below. The system 200 further illustratively includes a server 203, which again may be similar to those described above, that is configured to provide the client device 201 with access to the session responsive to the authentication token. By way of example, the session may be a Web or Software as a Service (SaaS) session, virtual desktop/app session, etc., which in some embodiments may be provided by the server 203 but in other embodiments will be provided or hosted by another server or Cloud service (not shown).

Figure 7:
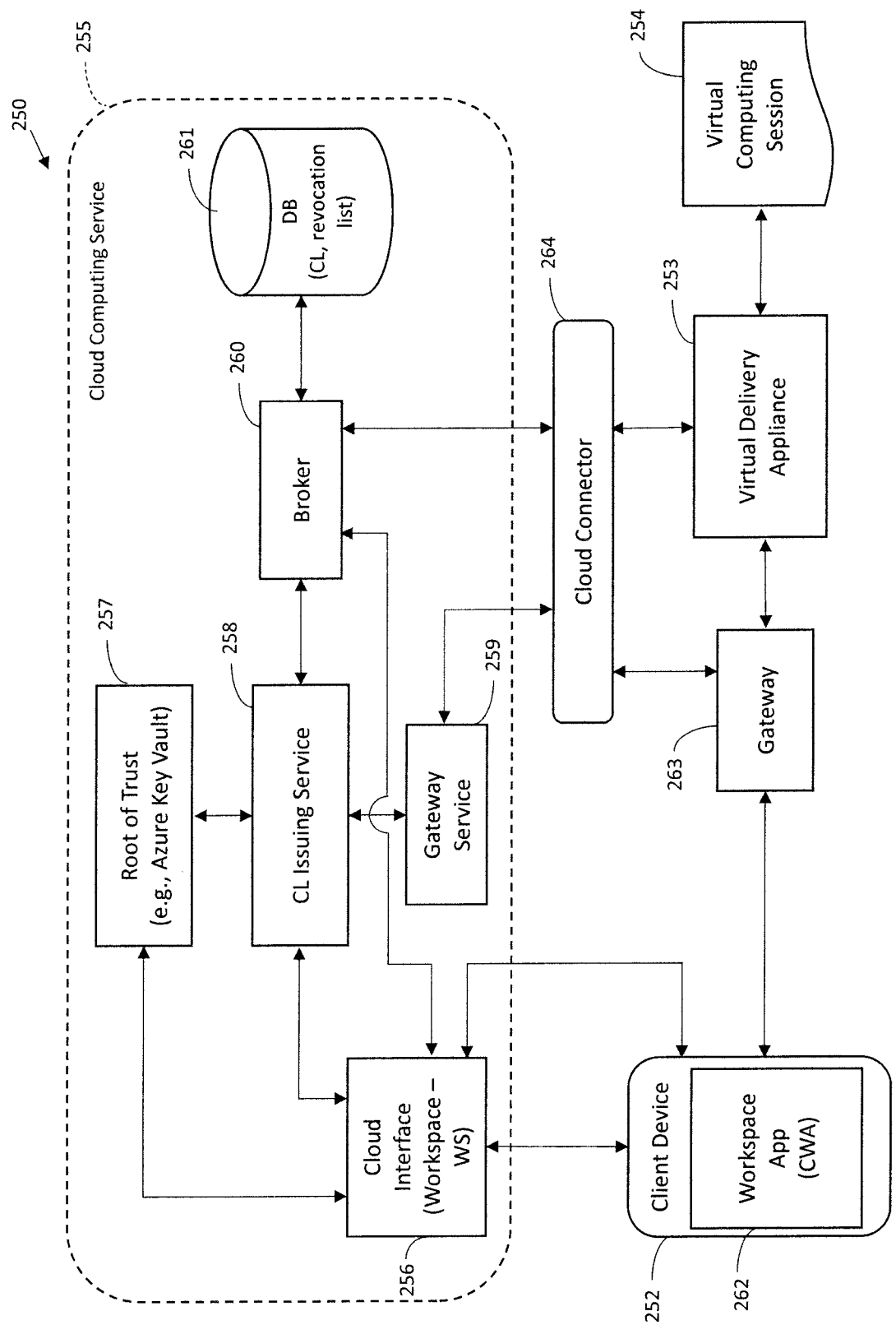
FIG. 7 is a schematic block diagram of an example embodiment of the computing system of FIG. 6 implementing a connection lease configuration.

The foregoing will now be further described in the context of an example implementation of a computing system 250 shown in FIG. 7 in which a client device 252 (e.g., client machines 12 and clients 52) connects to a virtual computing session 254 based upon a connection lease (CL). In the illustrated example, the above-described server 203 and connection lease generation functions are performed within a cloud computing service 255 (e.g., Citrix Cloud) which illustratively includes a cloud interface 256 configured to interface with the client device 252 for enrollment and connection lease generation. In the illustrated example, the cloud interface 256 is implemented with Citrix Workspace (WS), as discussed further above, and the client device 252 is running Citrix Workspace App (CWA) 262, although other suitable platforms may be used in different embodiments. The cloud computing service 255 further illustratively includes a root of trust (RoT) 257 (e.g., Azure Key Vault), Connection Lease Issuing Service (CLIS) 258, gateway service 259, broker 260, and database 261, which will be described further below.

By way of background, connection leases provide long-lived authorization to establish a network connection to a virtual delivery appliance 253 (e.g., Citrix VDA), as well as published resource entitlements (e.g., published applications or desktops the user is authorized to access). In the illustrated example, the connection to the virtual delivery appliance 253 is made through a gateway 263 (e.g., Citrix Gateway), and the gateway and virtual delivery appliance communicate with the cloud computing service 255 via a cloud connector 264. Since CLs are relatively long-lived (e.g., a few hours to weeks based on policies), and therefore the attack opportunity window is much longer, the security requirements may be more stringent. Therefore, CLs may be encrypted and signed. CLs may also be revoked to cope with events such as a stolen device, compromised user account, closed user account, etc.

CL revocation can be applied when an endpoint device or host (e.g., virtual delivery appliance 253) is online with respect to the CLIS 258 or broker 260, which is not a requirement for use of a CL since CLs are meant to be used in offline mode. Therefore, cached CL revocation lists may also be at the gateway 263 and the virtual delivery appliance 253. The present approach advantageously allows for embedding of different authentication credentials (e.g., user and device identity thumbprints (such as a hash of the endpoint public key), in an authentication token to help with the following: prevent the use of a valid CL on a different client device 252 by supplying the stolen credentials of the user for which the CL was originally issued; prevent the use of a valid CL on a different device by supplying the credentials of a different valid user; and prevent the use of a CL on the same device by a different authenticated user, e.g. by another user on a multi-user machine (cross-session vulnerability).

While CLs provide offline authorized access to resource locations in terms of network connectivity and initial session establishment, there may still be a need for user authentication into a remote session. For example, the virtual delivery appliance 253 may need user credentials to log the user into a virtual session. For example, explicit credentials such as user name and password may have to be provided to a Credential Provider or Credential Provider Filter at the virtual delivery appliance 253, which then provides the credentials to the Windows Logon subsystem to log the user into a new Windows session or attach to an existing session. Likewise, the gateway 263 may also require user authentication.

Without user authentication SSOn, users would otherwise be required to enter their credentials every time they connect via a CL, which will detract from the user experience. While user credentials may be stored on the client device 252, without further protection this may make them vulnerable to theft and replay attacks, e.g., by other users and/or from other devices. On the other hand, storing credentials in the Cloud and making them retrievable or reusable, e.g., via an authentication token pointing to credentials stored in a ticketing service (e.g., Citrix Cloud (CC) Ticketing), is relatively more secure. However, storing user credentials in the Cloud in a readily decryptable form may also have security as well as privacy concerns. Therefore, Cloud-stored credentials are typically short-lived, e.g., a few minutes or a few hours. Yet, this does not align well with the usage of CLs, which are long-lived, e.g., providing resource access for two weeks or more without re-authentication. Furthermore, Cloud-stored credentials may not be directly useable via the cloud interface 256 (e.g., in the case of Citrix Workspace when Workspace is down or unreachable from CWA).

The authentication approach described herein may advantageously be used in various use cases, including SSOn from a client app (e.g., CWA) to cloud computing service 255 (e.g., WS), CLIS 258 and CLIS file synching, published resource enumeration, endpoint device key bootstrapping, requesting CLs to be generated and synchronizing (downloading) CLs to the client device 201, for example. While some of these use cases may not require explicit user credentials, they may still require the use of long-lived tokens, which the present approach allows for by providing an authentication token based upon multiple types of authentication credentials (e.g., device and user credentials).

Figure 8A:
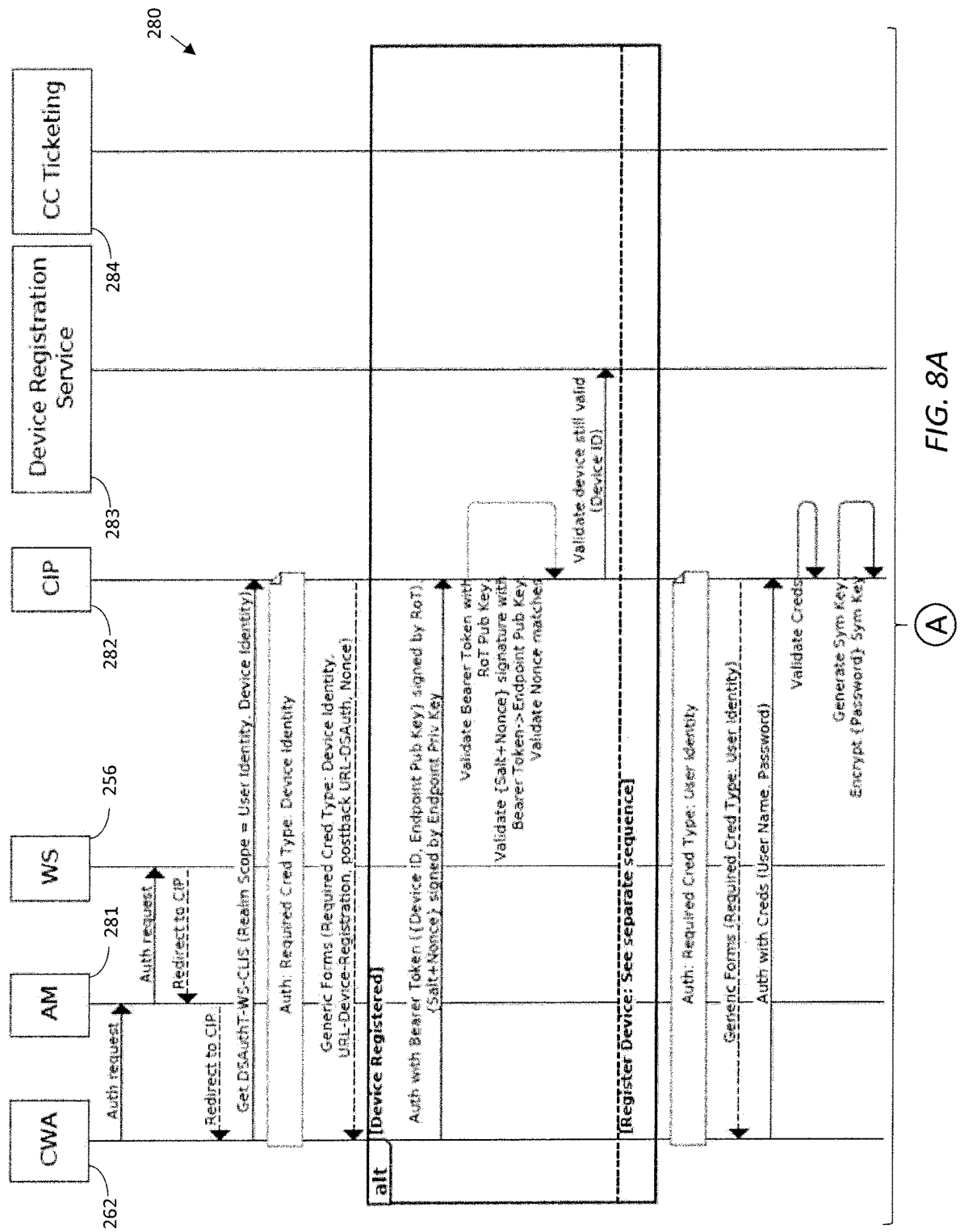
FIGS. 8A-8B are a sequence flow diagram illustrating authentication with user and device identities in an example implementation of the system of FIG. 7.
Figure 8B:
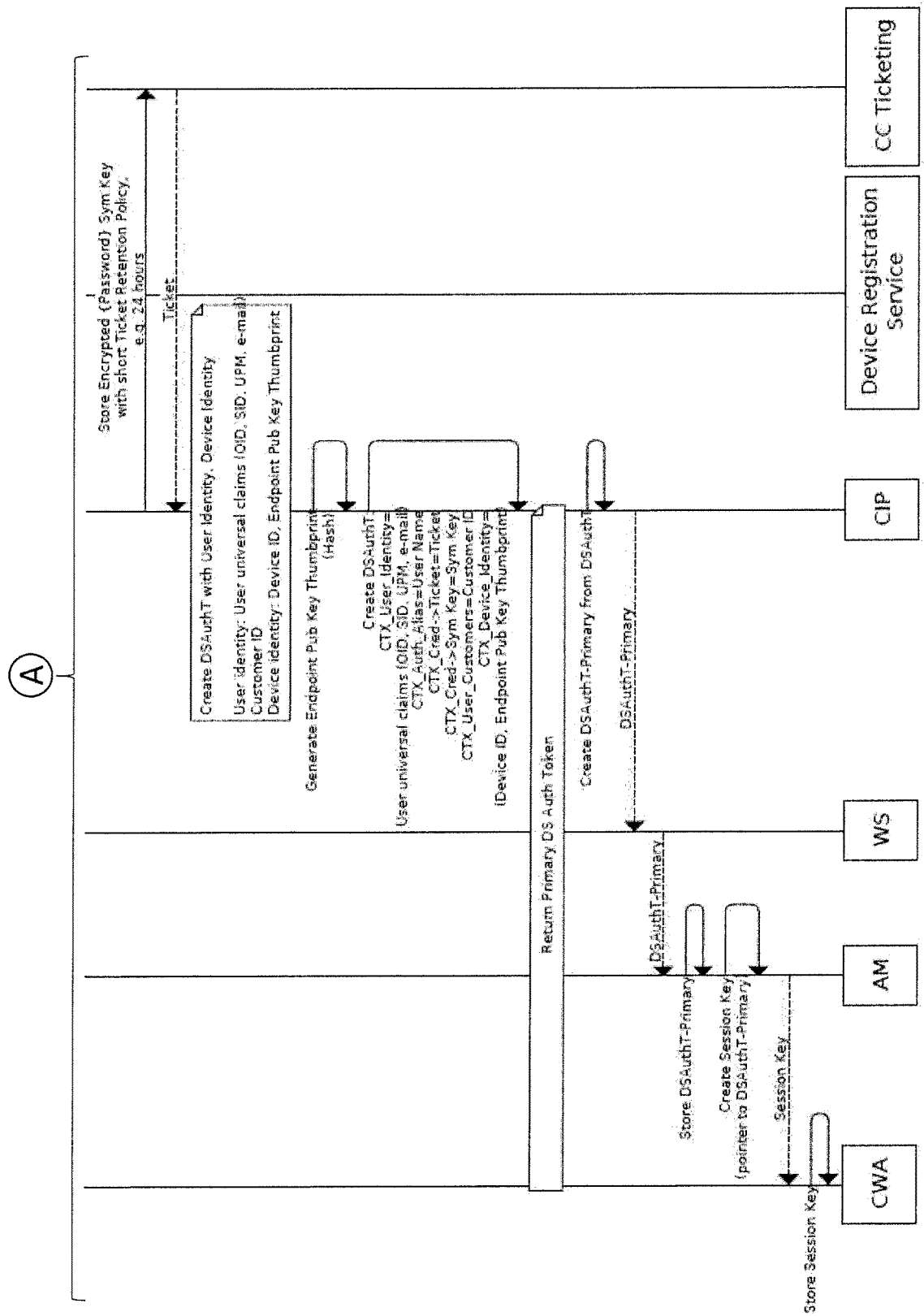

Referring additionally to the sequence flow diagram 280 of FIGS. 8A-8B, operation of the system 250 in accordance with an example implementation will now be described. For simplicity, in the following sequence diagrams the collective authentication platform Cloud elements of the system 255 will be referred as the Citrix Identity Platform (CIP) 282, a.k.a. Citrix Federated Identity Management System, including (Citrix legacy) Delivery Services (DS) Auth. CIP provides its own Identity Provider (IDP) but can also integrate with third party IDPs or other identity systems. CIP is based on OpenID Connect (OIDC). To authenticate to CIP, the CWA displays a web view of the CIP login page or a third party IDP login page. DS Auth is a Relying Party (RP) of OIDC.

Delivery Services Authentication Token (DSAuthT), CL, Polymorphic AuthT (polymorphic authentication token), mini-CL (validateSessionResult with status Redirect-Target), and gateway 263 connection ticket (GCT), include user and device identity thumbprints in a uniform format as follows: user identity—user universal claims (Open Identifier (OID), Security Identifier (SID), UPN e-mail); customer identifier (ID); and device identity—device ID, client device (Endpoint) Pub Key Thumbprint (hash). Furthermore, CL, Polymorphic AuthT, mini-CL, GCT may be in signed JSON objects of the form: manifest (clear)—includes user-device identity; payload (may be encrypted depending on type); symmetric key encrypted for entity (if payload is encrypted); and signature on manifest plus payload. DSAuthT is a primary token unless otherwise specified as a secondary token providing constrained access to a specific service, e.g., DSAuthT-WS-CLIS. In general, user universal claims include several different types of identifiers. The main and globally unique identifier used is OID. The rest of the identifiers are provided for compatibility with legacy systems or for additional checks, e.g., e-mail address.

A Refresh Token points to a Cloud-stored DSAuthT and is therefore also user-device bound. Consequently, the user-device identity also binds the above objects together and allows for uniform application of user and device assertions.

A Device Bearer Token is used in front-end authentication and has the form: {Device ID, Endpoint Pub Key} signed by the RoT 257.

In the sequence flow diagram 280, both user and device identity are proven. If the client device 252 is not registered, a separate flow may be executed with a Device Registration Service 283 to obtain a signed Device Bearer Token, as will be discussed further below. A challenge-response with a nonce may also be performed to ensure the client device 252 is the true owner of the Bearer Token. In some embodiments, the size of nonce may be held to 16 bytes to prevent malicious host asking to sign e-mail, doc, etc., if desired, although other sizes may also be used. The Device Registration Service 283 may be contacted to help ensure the client device 252 is still valid (not revoked). After user authentication, credentials may be stored in CC Ticketing 284 with a relatively short ticket retention policy, e.g., 24 hours. Credentials are encrypted but readily decryptable by the Cloud computing service 255. The symmetric key and CC ticket are stored as part of the DSAuthT. The DSAuthT is created with user and device identities. This functionality is implemented with the assistance of an authentication manager (AM) 281.

Figure 9:
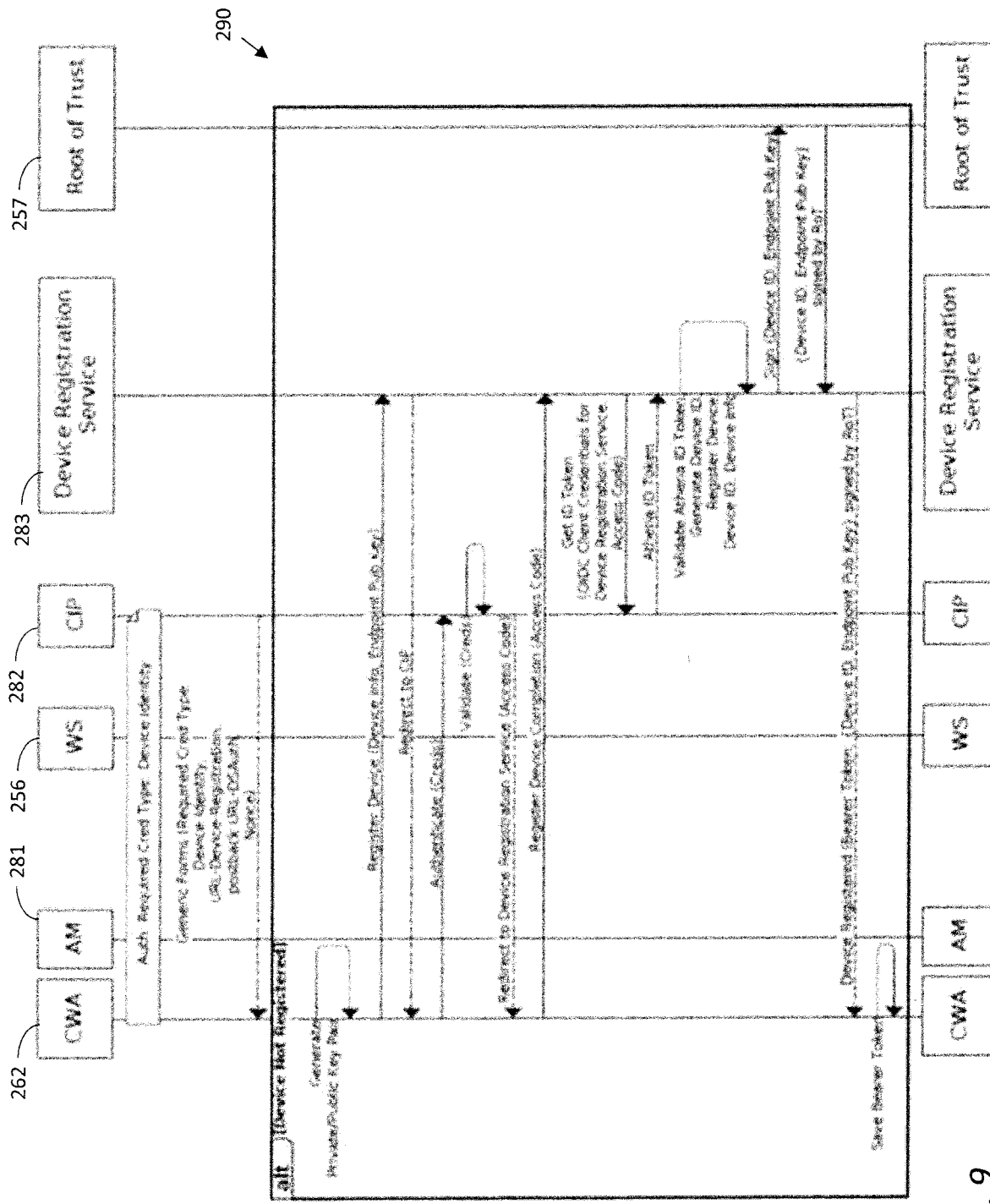
FIG. 9 is a sequence flow diagram illustrating client device registration in an example implementation of the system of FIG. 7.

Referring additionally to the sequence flow diagram 290 of FIG. 9, CWA 262 is redirected by the CIP 282 to the Device Registration Service 283, which is a Relying Party (RP) of OpenID Connect (OIDC). The Device Registration Service 283 bootstraps with the Root of Trust (RoT) 257 using service keys (not shown). CWA 262 generates a private/public key pair, e.g., with a hardware-backed private key (TPM). User authentication is required to register the client device 252. The Device Registration Service 283 obtains Device Info from CWA, generates the Device ID and registers the client device 252 in Cloud Storage, here the database 261. The Device Registration Service 283 creates a Bearer Token and signs it with the RoT 257 as follows: {Device ID, Endpoint Pub Key} signed by RoT. The Bearer Token is returned to CWA 262, where it is stored at the client device 252.

The Bearer Token is not stored in the Cloud computing service 255 in the illustrated example for resiliency reasons, e.g., if the Device Registration Service 283 is down during a request for validation. The Bearer Token is long-lived and is used in front-end authentication, e.g., to obtain DSAuthT, as noted above. The Bearer Token may be effectively invalidated/revoked by the Device Registration Service 283, e.g., when a client 252 device is reported stolen or the client device is re-registered, in which case the old token will fail validation. If the client device 252 rotates its private/public key pair, it may be required to register again and obtain a new Bearer Token.

In some embodiments, a secondary token may be obtained from a primary DSAuthT. More particularly, WS 256 and CLIS 258 are sister micro-services, and they may use the same secondary DSAuthT-WS-CLIS to avoid complexities of creating another relying party.

Figure 10A:
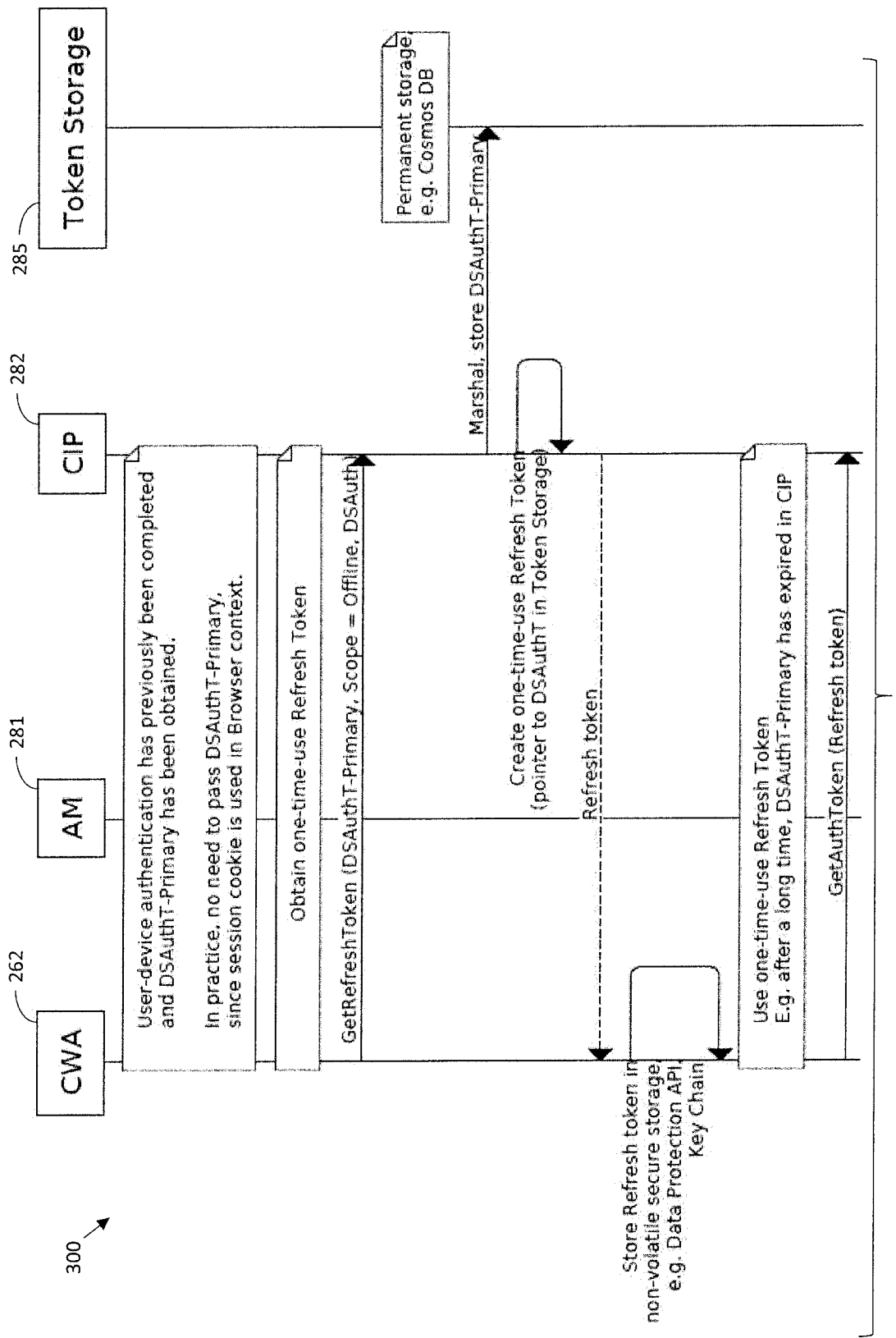
FIGS. 10A-10C are a sequence flow diagram illustrating authentication with long-lived one-time-use refresh tokens in an example implementation of the system of FIG. 7.
Figure 10B:
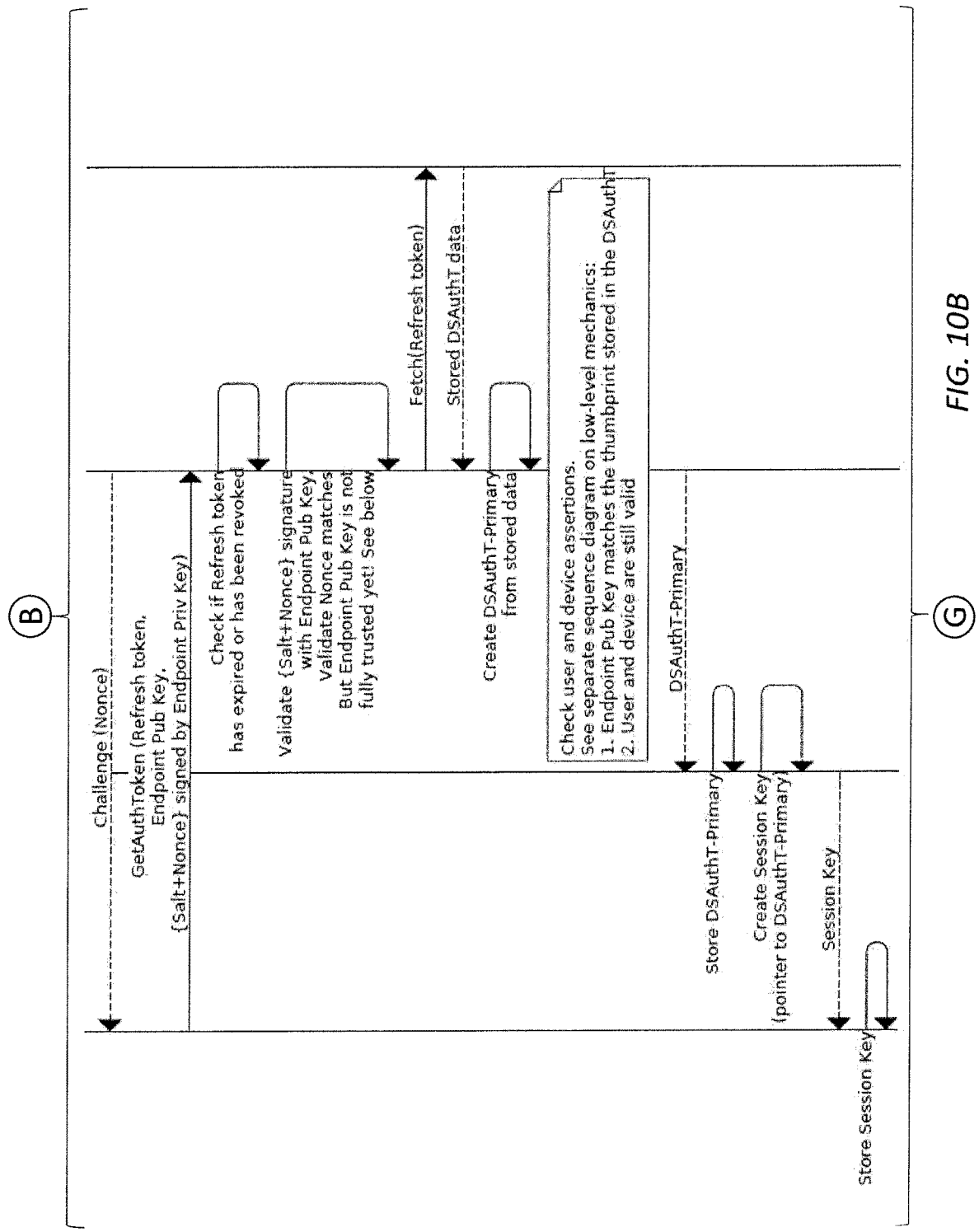
Figure 10C:
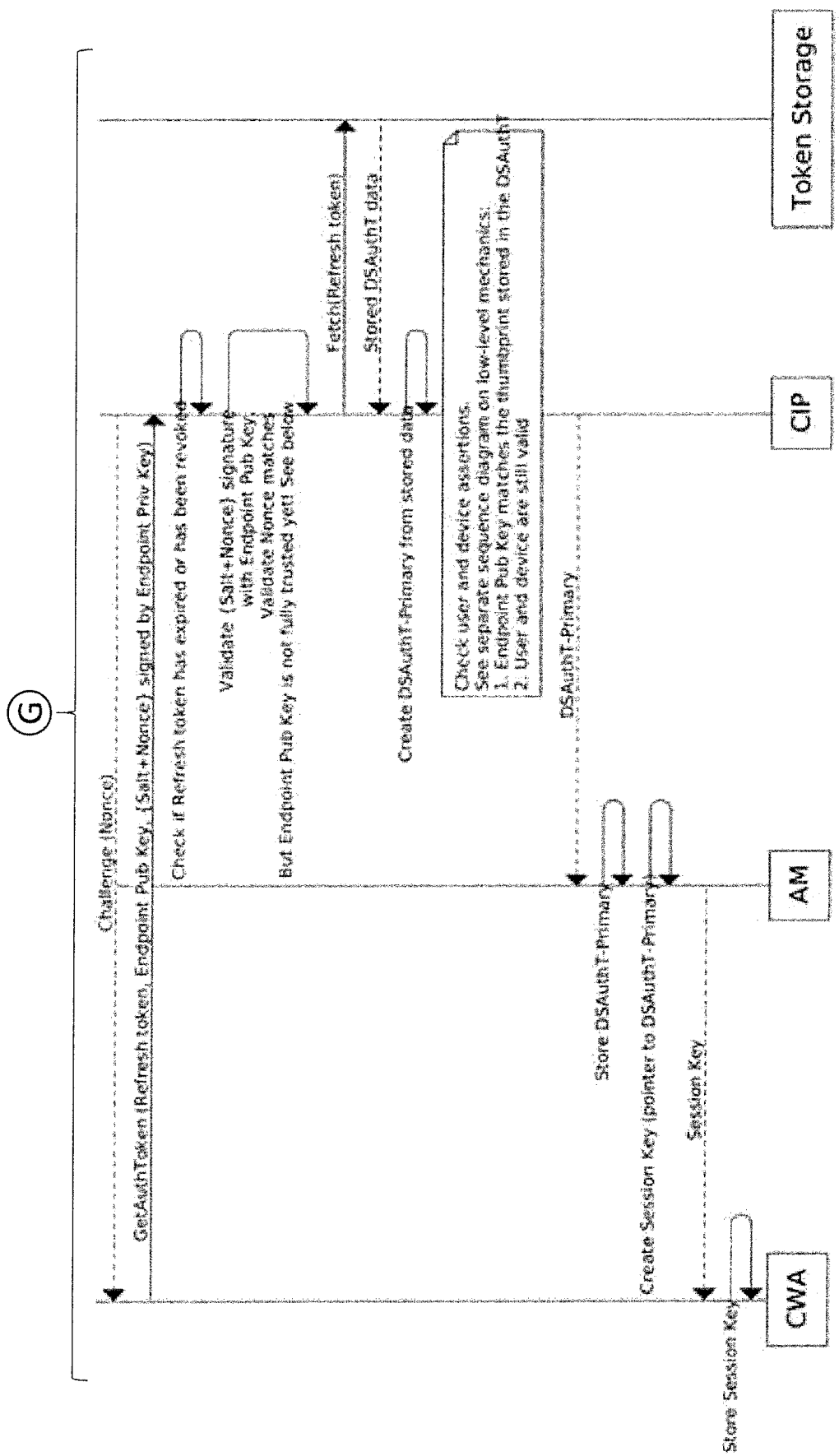

Referring additionally to the sequence flow diagram 300 of FIGS. 10A-10B, in the present example it is assumed that user-device authentication has previously been completed and DSAuthT-Primary has been obtained. In practice, there is no need to pass DSAuthT-Primary, since a session cookie may be used in Browser context (e.g., an embedded browser in CWA 262). A Refresh Token is generated, which effectively points to a DSAuthT that has been marshalled/stored in permanent Cloud Token Storage, e.g., Cosmos DB. (The CIP-held DSAuthT itself is short-lived.) CWA 262 stores the Refresh token in non-volatile secure storage, e.g., Data Protection API, Key Chain.

After a relatively long time, e.g., when DSAuthT-Primary has expired in CIP 282, CWA can use the one-time Refresh Token to obtain a new DSAuthT, recreated from Token Storage. Challenge-response with a nonce may be used to help ensure CWA 262 is the true owner of the Refresh Token. Yet, to fully trust the Endpoint Public Key, it is compared to the thumbprint stored in the DSAuthT pointed to by the Refresh Token. CIP 282 checks user and device assertions, as will be discussed further below. CIP 282 may also reject the Refresh Token if it has been individually revoked. CWA 262 may then request a new Refresh Token based on the current DSAuthT in CIP.

Figure 11:
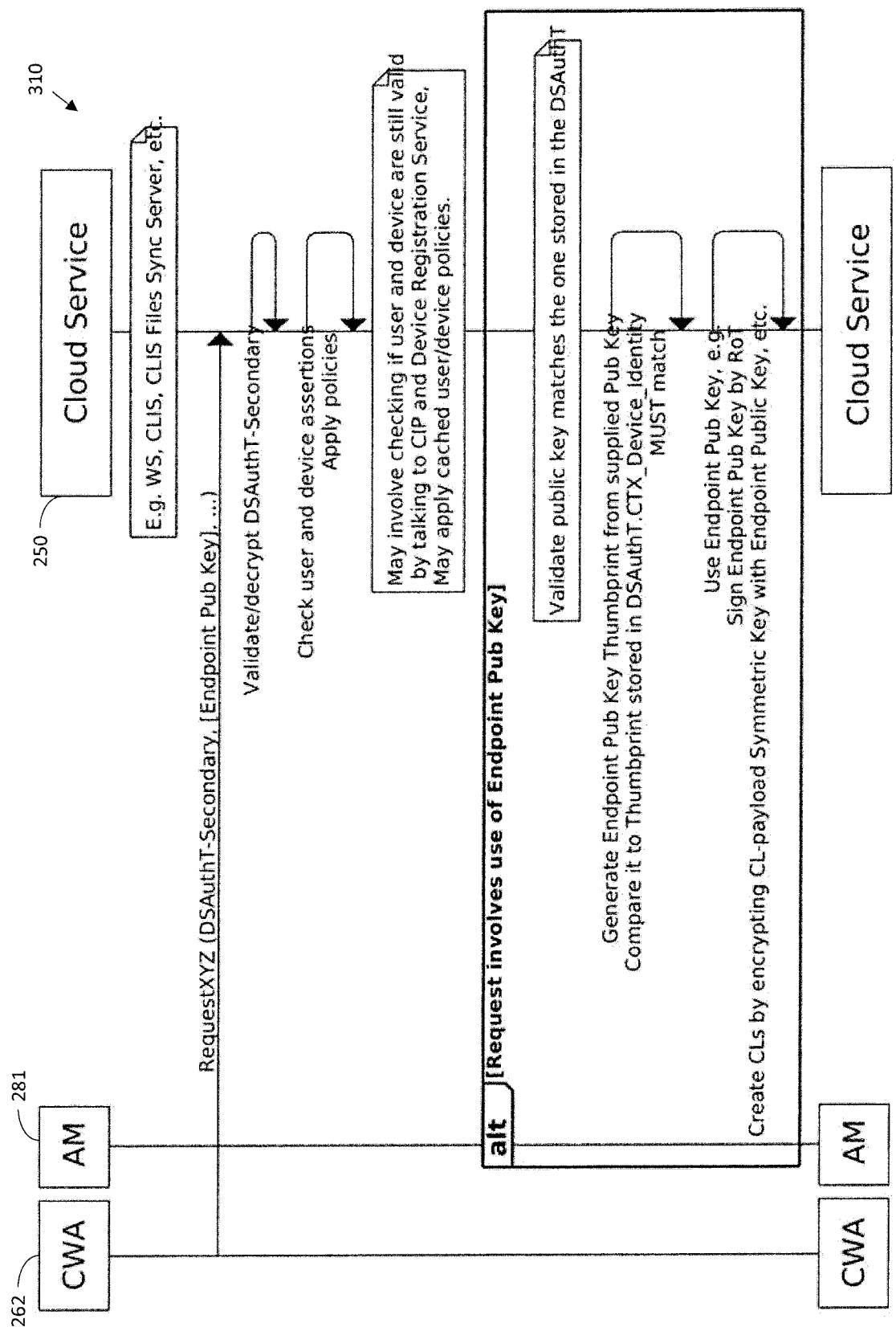
FIG. 11 is a sequence flow diagram illustrating an approach to check user and device assertions in an example implementation of the system of FIG. 7.

Referring additionally to the sequence flow diagram 310 of FIG. 11, an example approach is shown for how a service (e.g. cloud interface 256, CLIS 258, etc.), can check user and device assertions based on stored user-device identity in the DSAuthT. Other components and services (e.g., the gateway 263, virtual delivery appliance 253, broker 260) may use similar low-level mechanics when checking user-device identity in CL, mini-CL, GCT and applying policies (not illustrated). This may involve checking if the user and client device 252 are still valid by talking to CIP 282 and Device Registration Service 283. Cached user/device policies may also be applied, e.g., if Device Registration Service 283 is not reachable or for performance.

If the request involves the use of the Endpoint Public Key, additional validation is performed to ensure that the public key matches the thumbprint stored in the DSAuthT. Example requests involving the use of the public key may include: Sign Endpoint Pub Key by RoT 257; Create CLs by encrypting CL-payload Symmetric Key with the Endpoint Public Key; creating Polymorphic AuthT by encrypting AuthT-payload Symmetric Key with client device Public Key, etc.

Figure 12A:
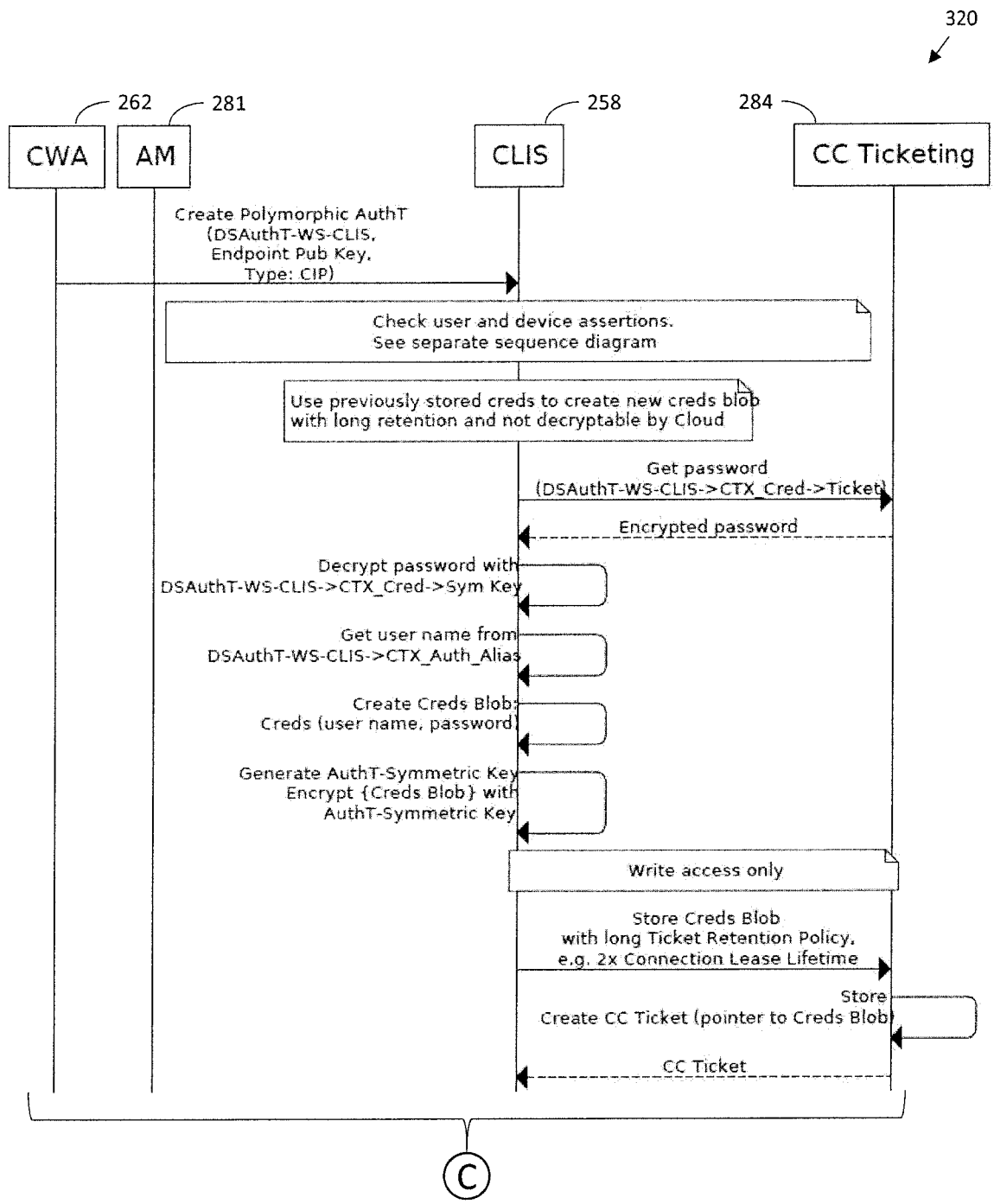
FIGS. 12A-12B are a sequence flow diagram illustrating an approach to create polymorphic authentication tokens based upon an identity platform in an example implementation of the system of FIG. 7.
Figure 12B:
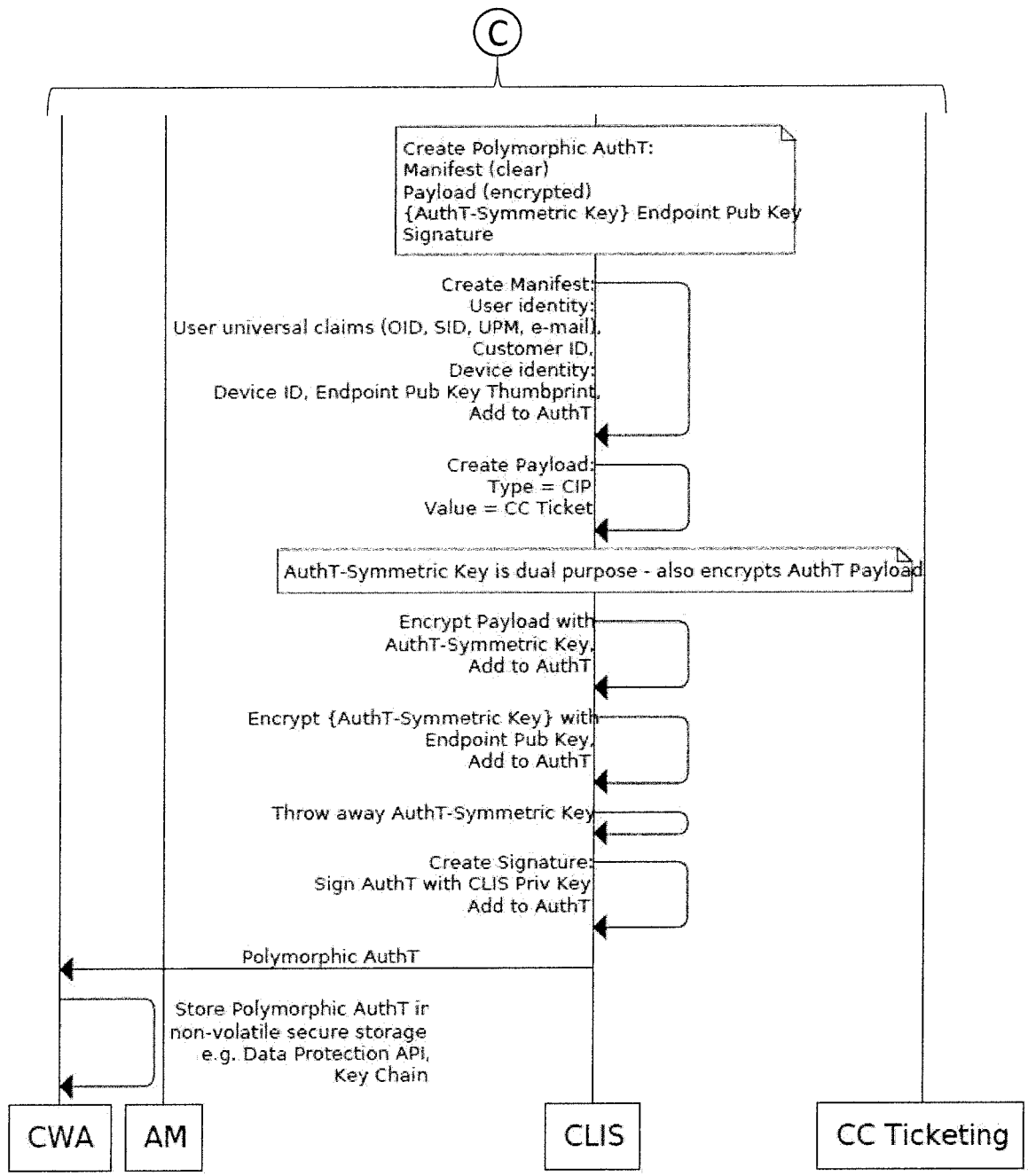

Referring additionally to the sequence flow diagram 320 of FIGS. 12A-12C, the previously created DSAuthT-WS-CLIS may be used while the Cloud-stored credentials are still valid, e.g., within 24 hours (based on policy). The CLIS 258 checks user and device assertions, as discussed above, and uses previously stored credentials associated with the DSAuthT to create a new credentials blob not decryptable by the Cloud computing service 255. The credentials blob is stored with long Ticket Retention Policy, e.g., $2x$ Connection Lease Lifetime, in CC Ticketing 284. The CLIS 258 has write access only for such long-lived tickets.

The long-lived authentication token may be polymorphic, in that it may include different types of credentials and/or may have different storage locations of credential blobs, as noted above. The Polymorphic AuthT may take the format: manifest (clear); user identity—user universal claims (OID, SID, UPN, e-mail); customer ID; device identity—device ID, Endpoint Pub Key Thumbprint (hash); payload (encrypted)—Type=CIP, Value=CC Ticket; {AuthT-Symmetric Key} encrypted with the client device Pub Key; and signature. CWA 262 stores the Polymorphic AuthT in non-volatile secure storage (e.g., Data Protection API) key chain, for example.

The polymorphic AuthT may be redeemed by the CWA 262 endpoint and not directly, and after establishing trust with the gateway 263/virtual delivery appliance 253 via a secure connection. Moreover, the gateway 263 and the broker 260 have read access to the long-lived credentials blob. Further, the gateway 263 and the virtual delivery appliance 253 can decrypt the payload after a successful secure connection. If CC Ticketing 284 or the broker 260 is down, the CL connection may succeed but SSOn may fail, and users may be required to manually input credentials, for example.

Figure 13A:
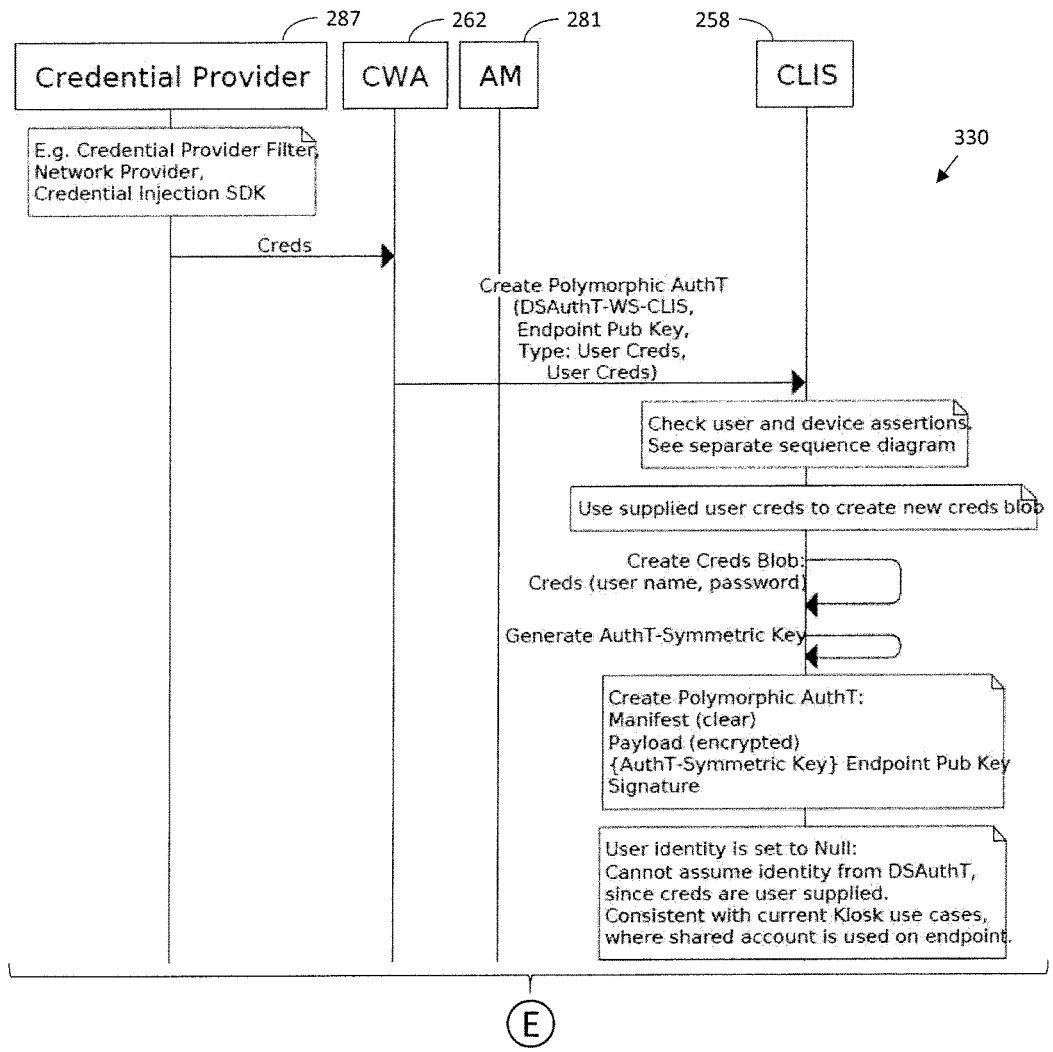
FIGS. 13A-13B are a sequence flow diagram illustrating an approach to create polymorphic authentication tokens based upon user credentials in an example implementation of the system of FIG. 7.
Figure 13B:
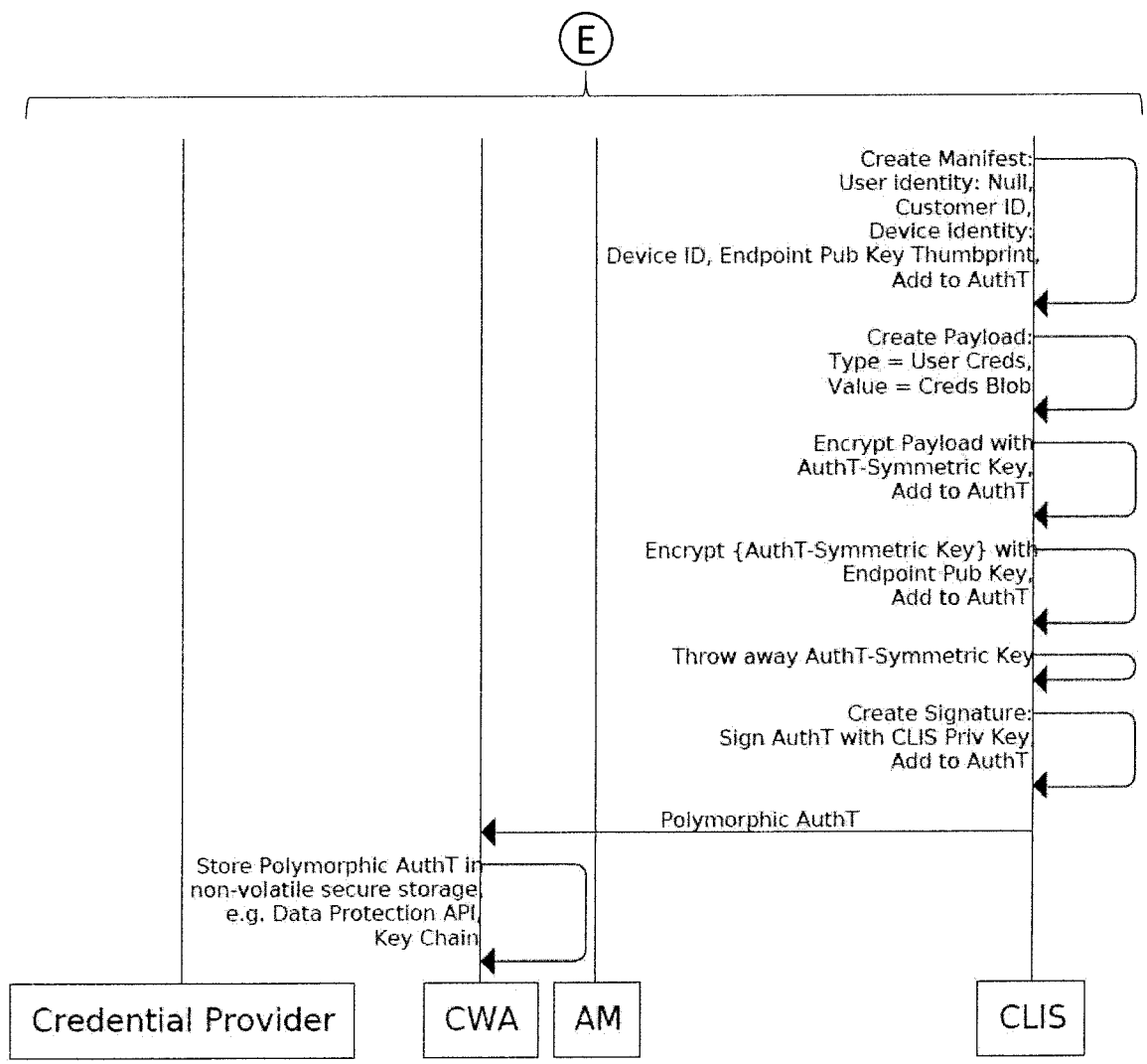

Referring additionally to the sequence flow diagram 330 of FIGS. 13A-13B, another similar approach to creating a polymorphic AuthT is now described, but in this approach the credentials are provided by the endpoint (client device 252), which may be domain-joined (and e.g. CWA 262 obtains credentials via Credential Provider/Credential Provider Filter/Network Redirector 287), or credentials might be directly injected into CWA 262 (e.g., via Fast Connect SDK 287). In this approach, CWA 262 provides the credentials to CLIS 258 to create the Polymorphic AuthT. CLIS 258 checks user and device assertions, as described above. Here again, the checks may be performed based on the user-device identity in the DSAuthT.

The Polymorphic AuthT may be created as follows. In the manifest (clear): user identity is set to Null—does not assume identity from DSAuthT, since creds are user supplied; Customer ID; device identity—Device ID, Endpoint Pub Key Thumbprint (hash). The Polymorphic AuthT further includes: payload (encrypted)—Type=User Creds, Value=Creds Blob; {AuthT-Symmetric Key} encrypted with the client device Pub Key; and signature.

Similar to the above approach, CWA 262 stores the Polymorphic AuthT securely and it is redeemed by CWA at the client device 252, e.g., after establishing trust with the gateway 263/virtual delivery agent 253 via a secure connection. However, CWA 262 can also redeem the credentials without this secure connection if desired, since CWA has access to its private key, and nothing more is required to decrypt the credentials. Additional security protection may optionally be used to guard access to the private key, e.g., personal identification number (PIN) or biometrics.

A benefit of this approach is the additional security of using payload encryption and a secure connection on top of TLS/DTLS to protect credentials against network sniffer/proxy "man-in-the-middle" attacks. A resiliency benefit of this type of Polymorphic AuthT is its independence of CC Ticketing 284 and the broker 260, in that the Gateway 263 and virtual delivery appliance 253 could perform SSOn in full Cloud Outage mode, as long as the gateway 263 is up.

Figure 14:
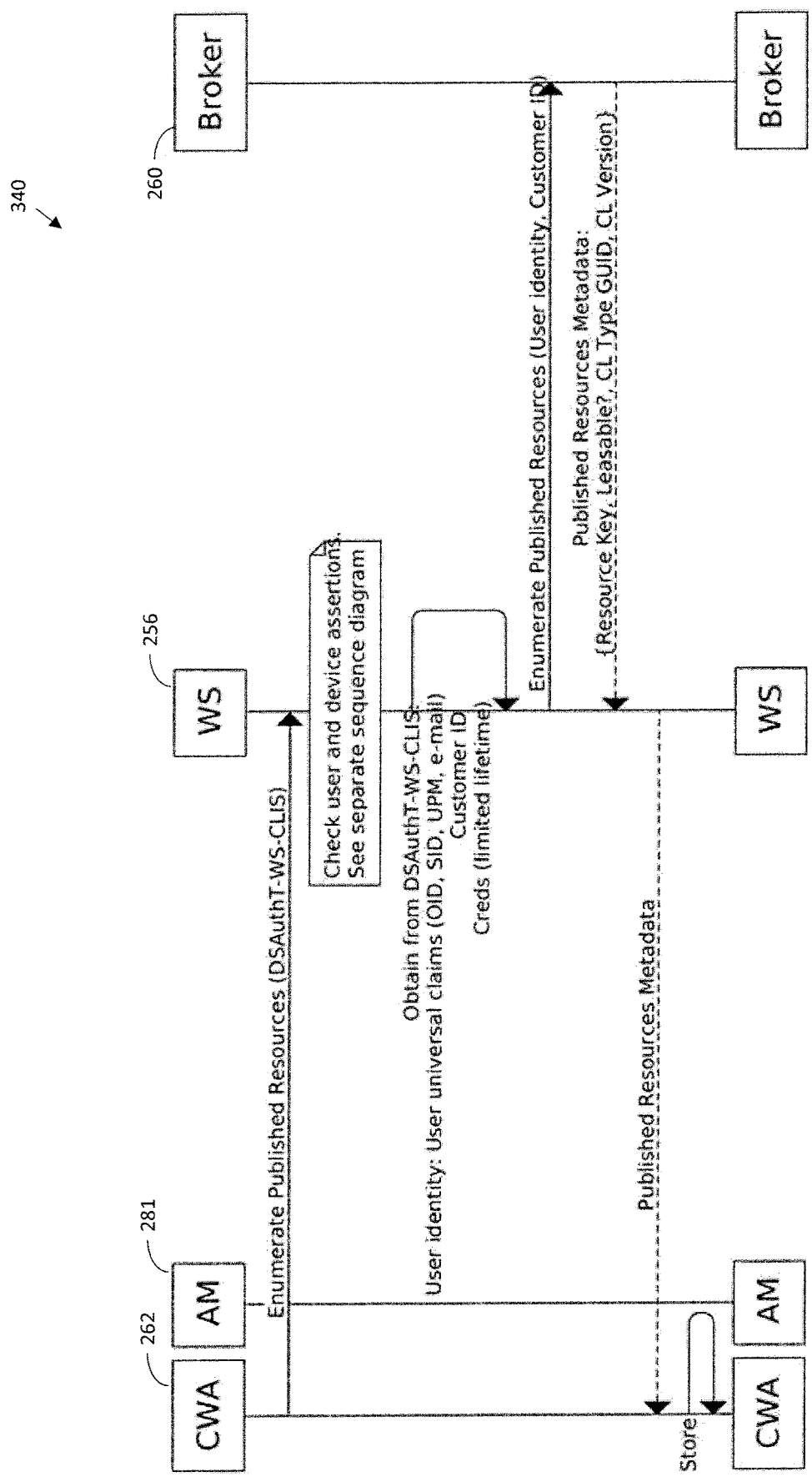
FIG. 14 is a sequence flow diagram illustrating an approach to enumerate published resources in an example implementation of the system of FIG. 7.

Referring additionally to the sequence flow diagram 340 of FIG. 14, the request by CWA 262 to the cloud interface 256 (WS) to enumerate published resources involves the use of DSAuthT-WS-CLIS. WS 256 checks user and client device 252 assertions, as discussed above. Here again, the checks are performed based on the user-device identity in the DSAuthT. The user identity is used by WS 256 to enumerate published resources from the broker 260.

The request by CWA 262 to CLIS 258 via WS to bootstrap keys requires the use of DSAuthT-WS-CLIS and the Endpoint Public Key. WS checks user and device assertions, as discussed further above. CWA 262 receives back its Endpoint Public Key signed by RoT 257, CLIS 258 Public Key signed by RoT, and RoT Public Key. The CLIS Public Key signed by RoT 257 and RoT Public Key may be received after a separate request (granular API) in some implementations.

A Lease Call Home request by CWA 262 to CLIS 258 to start creating CLs requires the use of DSAuthT-WS-CLIS and the Endpoint Public Key. WS 256 checks user and device assertions, as discussed further above. Here again, the checks are performed based on the user-device identity in the DSAuthT. The user identity is used by CLIS 258 to request Raw CL generation by a Connection Lease Service (CLS), as well as obtain a priority order from the WS-Store Service.

CL generation may be as follows. The manifest (clear) may include: user identity—user universal claims (OID, SID, UPN, e-mail); customer ID; and device identity—Device ID, Endpoint Pub Key Thumbprint (hash). The CL-Symmetric Key may be encrypted with the Endpoint Pub Key, so the endpoint can decrypt it.

CWA 262 initializes a CWA 262 CL Sync Engine with a DSAuthT-Secondary-Sync. CWA CL Sync Engine calls into a CLIS Files Sync Server using DSAuthT-Secondary-Sync to perform one-way sync of CLs from the user remote virtual folder into to the local folder. A CLIS Files Sync Server checks user and device assertions, as discussed above. Here again, the checks are performed based on the user-device identity in the DSAuthT.

The secure connection between the client device 252 and virtual delivery appliance 253 may be performed in two hops: first from the client device to the gateway 263, and then from the gateway to the virtual delivery appliance. At each hop, once the two entities trust each other, the sender re-encrypts the CL and Polymorphic AuthT Symmetric Keys with the receiver's public key, so the receiver can decrypt them. Gateway 263 can check user and device assertions, since user and device identities are included in the CL manifest. Either the broker 260 (in a Broker Online Mode) or virtual delivery appliance 253 (in Broker Outage Mode) can also check user and device assertions.

If a validateSessionResult is Redirect-Target (e.g., redirecting the client device 252 to another virtual delivery appliance 253), the new mini CL generated by the broker 260 includes user-device identity from the CL. The gateway 263 optionally performs authentication using the Polymorphic AuthT, which is validated just like a CL based upon the following: signature, date; Endpoint Pub Key hash in Polymorphic AuthT matches a previously stored version of the Client Pub Key; check user and device assertions—user and device identity is in AuthT manifest; and decrypt and use Polymorphic AuthT.

In direct connections, the virtual delivery appliance 253 uses the stored Client Pub Key, which is the same as the Endpoint Public Key, to validate the thumbprint in the CL and the Polymorphic AuthT. However, in gateway 263 connections, the Client Pub Key may be the Gateway Public Key, so the virtual delivery appliance 252 cannot use it for validation. Instead, CL Validation Pub Key=Endpoint Pub Key is relayed from the client device 252 via the gateway 263 to the virtual delivery appliance 253. So, in gateway 253 connections, the virtual delivery appliance 253 uses the CL Validation Pub Key to validate the thumbprint in both the CL and the Polymorphic AuthT. The public key of the gateway 263 is signed by CLIS 258 and its owning entity is (Client Pub Key.owningEntity==Gateway). CLIS 258 does not sign any other entity as the gateway 263.

In some implementations, the virtual delivery appliance 253 may use the CL→Resource Key and Polymorphic AuthT to start the virtual session and log the user in, as will be discussed further below. The virtual delivery appliance 253 creates a Resource Connection Ticket and stores it with the Session global unique identifier (GUID). The Resource Connection Ticket allows for later connection to a pre-authorized session. The Resource Connection Ticket also points to the stored and validated Polymorphic AuthT.

The gateway 263 creates a Gateway Connection Ticket (GCT) with info from CL and validateSessionResult mini-CL as follows. A manifest (clear) includes: expiration time—consistent with CL expiration time; user identity—user universal claims (OID, SID, UPN, e-mail); customer ID; and device identity—Device ID, Endpoint Pub Key Thumbprint. The CGT may further include: Payload (clear)—Resource Location, VDA IP and port, etc.; signature—Sign GCT with GW POP Priv Key. In some embodiments, the gateway 263 points of presence (POPs) may share public keys, which allows the GCT to be validated by any other gateway in failover scenario. In other embodiments, the GCT itself may contain the signing gateway POP's Pub Key, signed by the Root of Trust (RoT) 257. Thus it may be sufficient to distribute the RoT Pub Key to all gateway POPs, as opposed to gateway POPs sharing their Pub Keys. The client device 252 uses the GCT and Resource Connection Ticket to authorize the connection at gateway 263 and virtual delivery appliance 253, respectively.

Figure 15A:
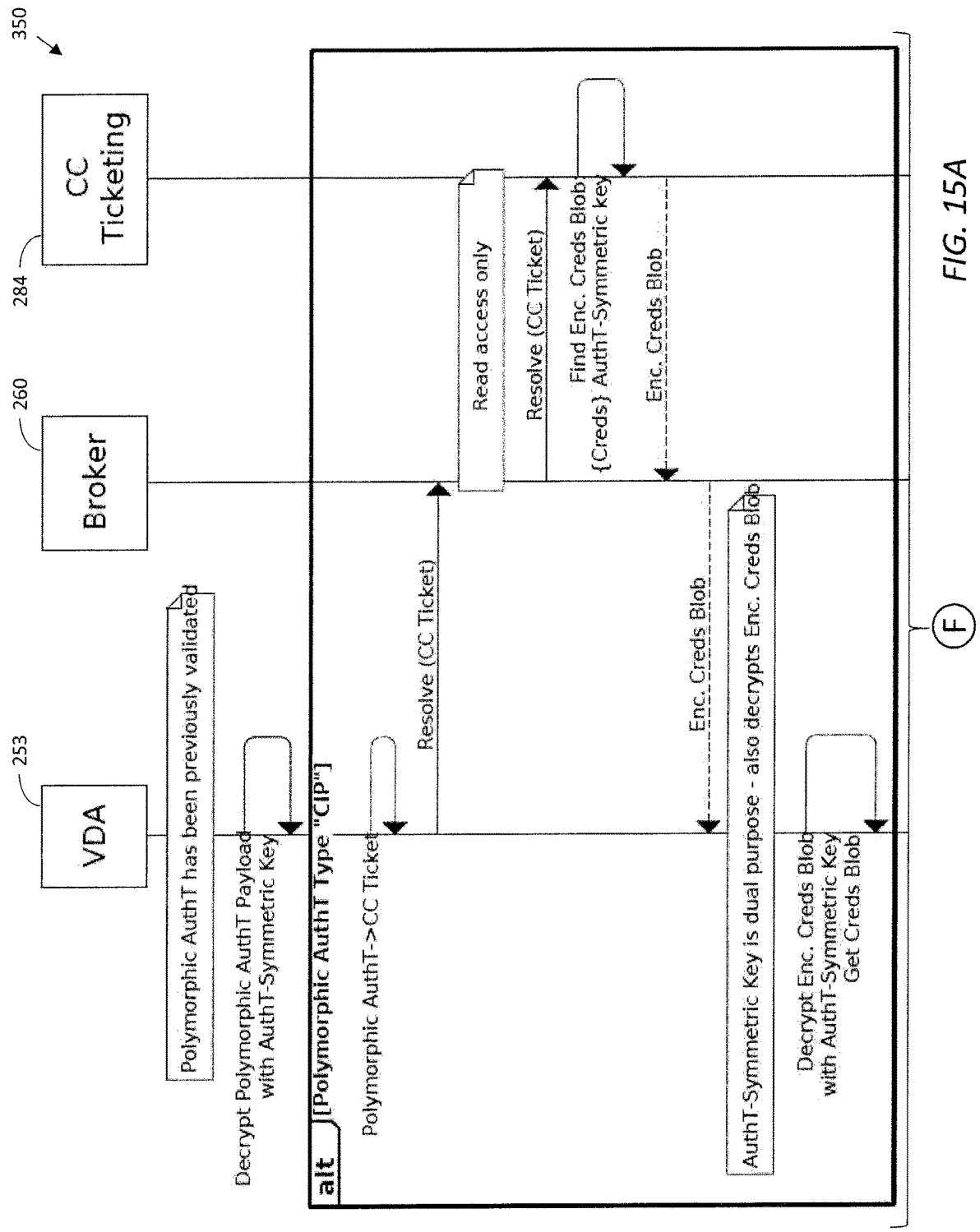
FIGS. 15A-15B are a sequence flow diagram illustrating an approach to session creation and authentication with single sign on based upon a connection lease in an example implementation of the system of FIG. 7.
Figure 15B:
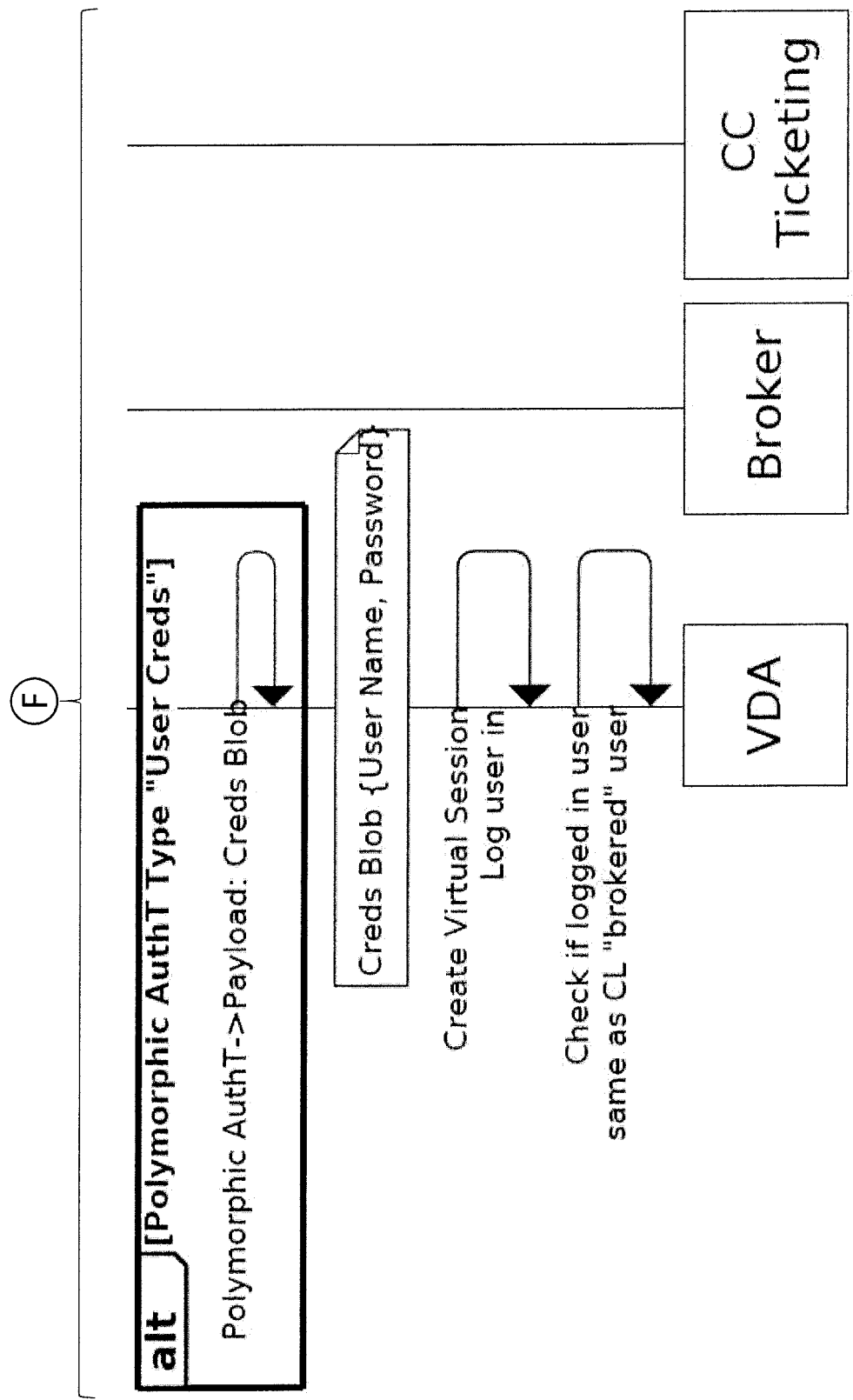

Referring now additionally to the sequence flow diagram 350 of FIGS. 15A-15B, it is assumed that the Polymorphic AuthT has been previously validated as discussed above. The virtual delivery appliance 253 decrypts Polymorphic AuthT Payload with AuthT-Symmetric Key. If Polymorphic AuthT Type is "CIP", the virtual delivery appliance 253 calls the broker 260, which calls CC Ticketing 284 to resolve the CC Ticket and return an encrypted Credentials Blob. The broker 260 and gateway 263 are entitled to redeem the long-lived CC Ticket.

If either the broker 260 or CC Ticketing 284 are down or otherwise not reachable, SSOn will fail and users provide credentials. The virtual delivery appliance 253 decrypts the encrypted Credentials Blob with AuthT-Symmetric Key, which is dual purpose. If Polymorphic AuthT Type is "User Creds", the virtual delivery appliance 253 obtains the Credentials Blob directly from the decrypted payload. Thus, there are no dependencies on the broker 260 and CC Ticketing 284. The virtual delivery appliance 253 proceeds to create a virtual session and log the user in. The virtual delivery appliance 253 performs the standard check that the logged in user is the same as the CL "brokered" user.

It should be noted that Polymorphic AuthT methods described above are not limited to user name-password types of user credentials. For example, they may be applied to reference credential IDs obtained using FIDO2-based (password-less) biometric authentication services. FIDO2 is the overarching term for FIDO Alliance's newest set of specifications. FIDO2 enables users to leverage common devices to easily authenticate to online services in both mobile and desktop environments. An added resiliency benefit of this type of Polymorphic AuthT is its independence of CC Ticketing 284 and the broker 260, meaning authentication can be performed with SSOn in full Cloud Outage mode as long as the FIDO2 Relying Party and Gateway are up.

From a security perspective, FIDO2's cryptographic login credentials are unique across every website, never leave the user's device and are never stored on a server. This security model helps eliminate the risks of phishing, password theft and replay attacks. Moreover, using biometrics helps address end-user convenience and privacy concerns. Users unlock cryptographic login credentials with simple built-in methods such as fingerprint readers or cameras on their devices, or by leveraging easy-to-use FIDO security keys. Because FIDO cryptographic keys are unique for each Internet site, they cannot be used to track users across sites. Plus, biometric data, when used, never leaves the user's device.

Furthermore, with respect to scalability, websites can enable FIDO2 through a JavaScript API call that is supported across leading browsers and platforms on devices consumers use every day. FIDO2 can also be used in Virtual Computing Sessions to support remotely hosted browsers, native applications and Windows Logon, by remoting the WebAuthN.dll APIs to the endpoint over a Citrix HDX FIDO2 Virtual Channel, for example.

The Polymorphic AuthT methods described above may also be applied to the Federated Authentication Service (FAS). In the case of Workspace, FAS can enable SSOn authentication to a Citrix VDA as long as a user authenticates to Workspace. The authentication method to Workspace does not matter and can be anything that allows authenticating to a modern web site, for instance Security Assertion Markup Language (SAML) via Active Directory Federation Services (ADFS), business-to-business (B2B) scenarios, etc. The core component of Federated Authentication Service is the FAS Server that has the authority to create virtual smart cards (issued by the enterprise Certifying Authority (CA)). The virtual smart cards are stored by the FAS Server either directly (e.g., in a Trusted Platform Module (TPM), if available) or in a connected Hardware Security Module (HSM).

In the case of Workspace, the FAS Server trusts Workspace for authentication. Upon Workspace authentication, the FAS Server issues a token/ticket that is subsequently used to trigger the virtual delivery agent 253 authentication with the associated virtual smart card. The virtual delivery agent 253 relies on a dedicated FAS Cryptographic Service Provider, that essentially remotes the cryptographic operations with the FAS server (to do the smart card authentication with the virtual smart card).

Certain changes may be made to the Federated Authentication Service for enhanced compatibility with connection leasing. For example, the FAS Authentication Token may desirably be long-lived for the launch sequence to not involve Citrix WS or other Citrix Cloud components. Further, a process to renew a FAS Authentication Token may be provided, e.g., using a Refresh Token. Furthermore, the FAS Authentication Token may desirably reference and be valid for multiple FAS Servers, which are part of a FAS Server failover/scalability group. This means that Workspace when assembling the FAS Authentication Token will connect to multiple FAS Servers.

If the FAS Servers are collocated with the virtual delivery appliances 253, a Polymorphic AuthT of type FAS, containing a FAS Authentication Token, will still work for SSOn at VDA when the Virtual Delivery System (VDS) is in Cloud Outage (CLO) Mode. The VDS involves Cloud components, e.g., WS, broker 260, CC Ticketing 284, etc. However, it will not work if the VDS is in CLO Mode and the FAS Authentication Token lifetime has expired. Typically, it is not possible for an end-user to do an interactive logon to a virtual delivery appliance 253 via LogonUI when FAS is being used. This means that when the VDS goes into CLO Mode, the end-user will still be able to authenticate to published desktops and applications for the remaining lifetime duration of the FAS Authentication Token. This has implications on the FAS Authentication Token renewal process. For example, a FAS Authentication Token may be renewed at half its lifetime to guarantee the ability to authenticate to the VDA for half the FAS Authentication Token lifetime if the VDS goes in CLO Mode.

Because FAS Authentication Tokens are long-lived, there may also be a method to revoke them. FAS Authentication Tokens may still be valid and usable when the VDS goes in CLO Mode. This means that the revocation procedure may involve the FAS Server(s). The FAS Server(s) may maintain the content of the issued FAS Authentication Tokens, e.g., to allow revoking them per user-device identity.

The above-described approaches may advantageously provide various technical advantages, including secure offline authentication SSOn in complete or partial Cloud outage mode. Furthermore, secure management of different types of credentials may be provided, as well as authentication with user-device credentials, long-lived Refresh Tokens, CLs and Polymorphic Auth SSOn Tokens. In addition, user and device assertions may advantageously be applied in online and offline modes. It should be noted that while the examples described above were in the context of connection lease implementations, the polymorphic authentication token approach may also be used in non-connection lease implementations as well. In other words, the authentication token may be used to provide access to sessions irrespective of whether the client uses a connection lease configuration to connect to the session/published resource.

Figure 16:
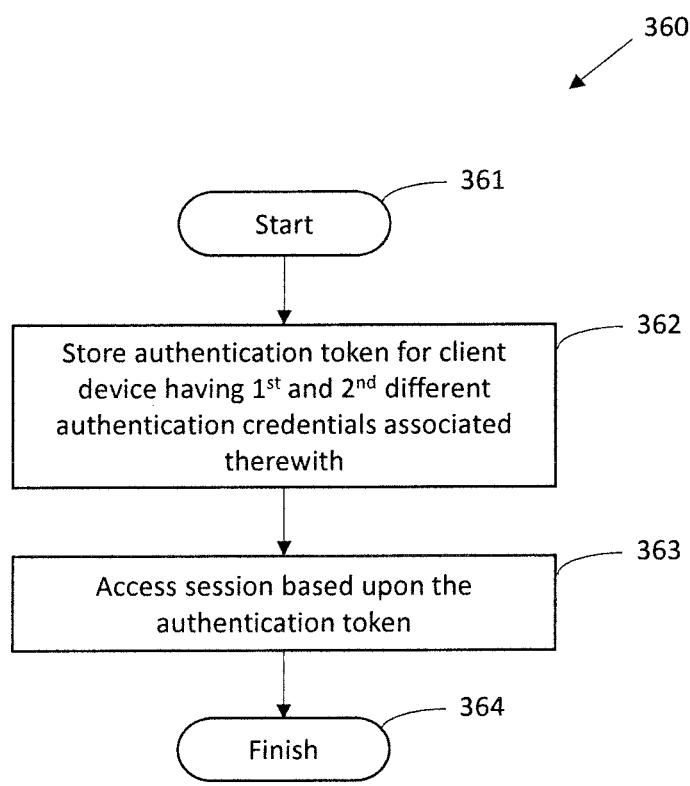
FIG. 16 is a flow diagram illustrating example method aspects associated with the system of FIG. 6.

Turning now to the flow diagram 360 of FIG. 16, beginning at Block 361, a related method illustratively includes storing an authentication token for a client device 201 having first and second authentication credentials associated therewith (Block 362), and cooperating with a server 203 to access a session based upon the authentication token, at Block 363, as discussed further above. The method of FIG. 16 illustratively concludes at Block 364.

The following examples are further example embodiments, from which other permutations and configurations will be apparent to the skilled artisan.

Example 1 is a computing device comprising a memory and a processor configured to cooperate with the memory to store an authentication token having first and second authentication credentials associated therewith, with the first and second authentication credentials being different from one another, and cooperate with a server to access a session based upon the authentication token.

Example 2 includes the subject matter of Example 1, wherein one of the first and second authentication credentials comprises a user credential.

Example 3 includes the subject matter of Example 2, wherein the user credential is stored in the memory at the client device.

Example 4 includes the subject matter of Example 2, wherein the user credential is stored in a virtual smart card with an authentication service.

Example 5 includes the subject matter of Example 1, wherein one of the first and second authentication credentials comprises a public key associated with the client device.

Example 6 includes the subject matter of Example 5, wherein the public key is signed by a Root of Trust (RoT).

Example 7 includes the subject matter of Example 1, wherein the processor cooperates with the server to access the sessions further based upon a connection lease assigned to the computing device.

Example 8 includes the subject matter of Example 1, wherein the first and second authentication credentials are stored in different locations.

Example 9 includes the subject matter of Example 1, wherein the authentication token comprises a polymorphic authentication token.

Example 10 includes the subject matter of Example 1, wherein the session comprises at least one of a Web application session, Software as a Service (SaaS) application session, virtual application session, and a virtual desktop session.

Example 11 is a method comprising storing an authentication token for a client device having first and second authentication credentials associated therewith, with the first and second authentication credentials being different from one another; and at the client device, cooperating with a server to access a session based upon the authentication token.

Example 12 includes the subject matter of Example 11, wherein one of the first and second authentication credentials comprises a user credential.

Example 13 includes the subject matter of Example 11, wherein one of the first and second authentication credentials comprises a public key associated with the client device.

Example 14 includes the subject matter of Example 11, wherein the client device cooperates with the server to access the sessions further based upon a connection lease assigned to the computing device.

Example 15 includes the subject matter of Example 11, wherein the first and second authentication credentials are stored in different locations.

Example 16 is directed to a computing device comprising a memory and a processor configured to cooperate with the memory to store an authentication token in the memory having first and second authentication credentials associated therewith, with the first and second authentication credentials being different from one another, and cooperate with a server to access a session based upon the authentication based upon a connection lease assigned to the computing device.

Example 17 includes the subject matter of Example 16, wherein one of the first and second authentication credentials comprises a user credential.

Example 18 includes the subject matter of Example 16, wherein one of the first and second authentication credentials comprises a public key associated with the client device.

Example 19 includes the subject matter of Example 18, wherein the public key is signed by a Root of Trust (RoT).

Example 20 includes the subject matter of Example 16, wherein the authentication token comprises a polymorphic authentication token.

As will be appreciated by one of skill in the art upon reading the foregoing disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A computing device comprising:
a memory and a processor connected to the memory, the processor for
obtaining from a device registration service and storing a bearer token in the memory including a device identity of the computing device and a public encryption key of the computing device and a Root of Trust (RoT), wherein the public encryption key is signed by the Root of Trust (RoT);
obtaining from an identity platform and storing an authentication token in the memory based upon the bearer token and including a user identity of a user and the device identity of the computing device, the authentication token having an expiration;
communicating the authentication token to a server;
responding to a challenge from the server to validate that the device identity from the authentication token is associated with the computing device based upon a device credential;
communicating a user credential to the server to validate that the user is associated with the user identity from the authentication token;
accessing a session via the server responsive to validation of the device identity and the user identity from the authentication token;
communicating with the identity platform the authentication token after the expiration based upon the bearer token; and
wherein the device credential comprises the public encryption key associated with the computing device.

2. The computing device of claim 1 wherein the user credential is stored in the memory at the computing device.

3. The computing device of claim 1 wherein the user credential is stored in a virtual smart card with an authentication service.

4. The computing device of claim 1 wherein the user and device credentials are stored in different locations.

5. The computing device of claim 1 wherein the authentication token comprises a polymorphic authentication token.

6. The computing device of claim 1 wherein the session comprises at least one of a Web application session, Software as a Service (SaaS) application session, virtual application session, and a virtual desktop session.

7. A method comprising:
storing an authentication token fora computing device in a memory, the authentication token including a user identity of a user and a device identity of the computing device, and the authentication token having an expiration; and
at the computing device,
obtaining from a device registration service and storing a bearer token in the memory including a device identity of the computing device and a public encryption key of the computing device and a Root of Trust (RoT), wherein the public encryption key is signed by the Root of Trust (RoT);
communicating the authentication token to a server
responding to a challenge from the server to validate that the device identity from the authentication token is associated with the computing device based upon a device credential
communicating a user credential to the server for validating that the user is associated with the user identity from the authentication token
accessing a session via the server responsive to validation of the device identity and the user identity from the authentication token;
communicating with the identity platform for renewing the authentication token after the expiration based upon the bearer token; and
wherein the device credential comprises the public encryption key associated with the computing device.

8. The method of claim 7 wherein the computing device communicates with the server to access the sessions further based upon a connection lease assigned to the computing device.

9. The method of claim 7 wherein the user and device credentials are stored in different locations.

10. A non-transitory computer-readable medium having computer-executable instructions for causing a computing device to perform steps comprising:
obtaining from a device registration service and storing a bearer token in the memory including a device identity of the computing device and a public encryption key of the computing device and a Root of Trust (RoT), wherein the public encryption key is signed by the Root of Trust (RoT);
obtaining from an identity platform and storing an authentication token at the computing device including a user identity of a user and a device identity of the computing device;
communicating the authentication token to a server;
responding to a challenge from the server to validate that the device identity from the authentication token is associated with the computing device based upon a device credential;
communicating a user credential to the server to validate that the user is associated with the user identity from the authentication token;
accessing a session via the server responsive to validation of the device identity and the user identity from the authentication token; and
communicating with the identity platform for renewing the authentication token after the expiration based upon the bearer token; and
wherein the device credential comprises the public encryption key associated with the computing device.

11. The non-transitory computer-readable medium of claim 10 wherein the user credential is stored at the computing device.

12. The non-transitory computer-readable medium of claim 10 wherein the user credential is stored in a virtual smart card with an authentication service.

13. The non-transitory computer-readable medium of claim 10 wherein the user and device credentials are stored in different locations.

14. The non-transitory computer-readable medium of claim 10 wherein the authentication token comprises a polymorphic authentication token.

15. The non-transitory computer-readable medium of claim 10 wherein the session comprises at least one of a Web application session, Software as a Service (SaaS) application session, virtual application session, and a virtual desktop session.

* * * * *